(12) United States Patent
Woods et al.

(10) Patent No.: US 7,497,130 B2
(45) Date of Patent: Mar. 3, 2009

(54) LINER FOR A FLOW METER

(75) Inventors: Elmer B. Woods, West Bend, WI (US);
Bruce A. Bliefnick, Fond du Lac, WI (US); James P. Maslowski, Wauwatosa, WI (US)

(73) Assignee: PDC Facilities, Inc., Hartland, WI (US)

( * ) Notice: Subject to any disclaimer, the term of this patent is extended or adjusted under 35 U.S.C. 154(b) by 478 days.

(21) Appl. No.: 11/181,470

(22) Filed: Jul. 14, 2005

(65) Prior Publication Data

US 2006/0010991 A1    Jan. 19, 2006

Related U.S. Application Data

(60) Provisional application No. 60/677,458, filed on May 4, 2005, provisional application No. 60/669,594, filed on Apr. 8, 2005, provisional application No. 60/654,327, filed on Feb. 18, 2005, provisional application No. 60/588,242, filed on Jul. 15, 2004.

(51) Int. Cl.
*G01F 1/00*  (2006.01)
*G01F 1/84*  (2006.01)

(52) U.S. Cl. .................................... 73/861; 73/861.357

(58) Field of Classification Search ..................
73/861.355–861.357, 861.12
See application file for complete search history.

(56) References Cited

U.S. PATENT DOCUMENTS

| | | | |
|---|---|---|---|
| 1,052,379 A | | 2/1913 | Ranken et al. |
| 2,088,922 A | * | 8/1937 | Porteous ...................... 285/55 |
| 2,124,293 A | * | 7/1938 | Goldstein .................... 604/114 |
| 2,981,108 A | | 4/1961 | Andersen et al. |
| 3,469,685 A | | 9/1969 | Baermann |
| 3,695,104 A | * | 10/1972 | Mannherz et al. ......... 73/861.12 |
| 3,750,468 A | * | 8/1973 | Grauer .................... 73/861.12 |
| 4,112,762 A | | 9/1978 | Turner et al. |
| 4,329,879 A | * | 5/1982 | Appel et al. ............. 73/861.12 |
| 4,388,834 A | * | 6/1983 | Schmoock ............... 73/861.12 |
| 4,592,886 A | * | 6/1986 | Mannherz ................... 264/262 |
| 4,741,215 A | * | 5/1988 | Bohn et al. .............. 73/861.12 |
| 4,877,033 A | | 10/1989 | Seitz, Jr. |

(Continued)

FOREIGN PATENT DOCUMENTS

DE    41 19 396    8/1992

(Continued)

OTHER PUBLICATIONS

Micro-Motion; Model D and DT Mass Flow and Density Sensors; Product Data Sheet; Mar. 2005; 36 pages.

(Continued)

*Primary Examiner*—Harshad Patel
(74) *Attorney, Agent, or Firm*—Michael Best & Friedrich LLP

(57) ABSTRACT

A flow meter assembly includes a flow meter including a tube through which a fluid flows. The flow meter is operable to measure the amount of fluid flowing through the tube. A liner is positioned within the tube and is removably coupled with the tube such that fluid flowing through the tube flows through the liner without contacting an inner surface of the tube.

46 Claims, 14 Drawing Sheets

U.S. PATENT DOCUMENTS

| | | | | |
|---|---|---|---|---|
| 4,911,018 | A * | 3/1990 | Hartman | 73/861.12 |
| 5,108,372 | A * | 4/1992 | Swenson | 604/113 |
| 5,157,975 | A | 10/1992 | Tanaka et al. | |
| 5,195,976 | A * | 3/1993 | Swenson | 604/113 |
| 5,227,105 | A | 7/1993 | Eucker et al. | |
| 5,260,036 | A * | 11/1993 | Weigold et al. | 422/186.3 |
| 5,397,552 | A * | 3/1995 | Weigold et al. | 422/186.3 |
| 5,403,533 | A | 4/1995 | Meier | |
| 5,437,199 | A * | 8/1995 | Kaplan | 73/863.23 |
| 5,670,723 | A * | 9/1997 | Hansen et al. | 73/861.12 |
| 5,731,527 | A | 3/1998 | Van Cleve | |
| 5,773,723 | A * | 6/1998 | Lewis et al. | 73/861.12 |
| 5,814,739 | A * | 9/1998 | Van Cleve | 73/861.357 |
| 5,918,285 | A | 6/1999 | Van der Pol | |
| 6,176,525 | B1 | 1/2001 | McMillan et al. | |
| 6,450,042 | B1 | 9/2002 | Lanham et al. | |
| 6,451,012 | B2 | 9/2002 | Dobak, III | |
| 6,474,175 | B2 | 11/2002 | Davies et al. | |
| 6,582,442 | B2 * | 6/2003 | Simon et al. | 606/131 |
| 6,606,917 | B2 | 8/2003 | Sund et al. | |
| 6,689,303 | B2 | 2/2004 | Seki et al. | |
| 6,725,726 | B1 | 4/2004 | Adolfs et al. | |
| 6,776,053 | B2 | 8/2004 | Schlosser et al. | |
| 6,806,078 | B2 * | 10/2004 | Newman | 435/262.5 |
| 7,165,467 | B2 | 1/2007 | Klees et al. | |
| 2002/0139199 | A1 | 10/2002 | Lanham et al. | |
| 2003/0023181 | A1 | 1/2003 | Mault | |
| 2003/0098069 | A1 | 5/2003 | Sund et al. | |
| 2005/0011287 | A1 | 1/2005 | Schlosser et al. | |
| 2005/0160983 | A1 * | 7/2005 | Sneh | 118/715 |
| 2005/0247558 | A1 * | 11/2005 | Anex et al. | 204/275.1 |
| 2006/0106365 | A1 | 5/2006 | Lane et al. | |
| 2006/0159155 | A1 | 7/2006 | Lantz et al. | |

FOREIGN PATENT DOCUMENTS

| | | |
|---|---|---|
| EP | 1281349 | 2/2003 |
| GB | 1119055 | 7/1968 |
| JP | 2001327490 | 11/2001 |
| JP | 2003000597 | 1/2003 |

OTHER PUBLICATIONS

Teflon and Tefzel High-Performance Films; website: http:/www2.dupont.com/Teflon_Industrial/en_US/products/product_by_type/films/; printed on May 18, 2006; 1 page.

DuPont Films; Tefzel Fluoropolymer film; Types LZ, CLZ, and CLZ-20; Specification Bulletin T 62-4; at least as early as Jan. 1, 2006; 4 pages.

Teflon Industrial; Six Basic Types of Teflon Coating; website: http://www2.dupont.com/Teflon_Industrial/en_US/products/selection_guides/coatings.html; printed on May 18, 2006; 7 pages.

Teflon Finishes in the Semiconductor Industry; website: HTTP//72.14.203.104/search?q=cache:1XrFjt_3uIJ:www.fabtechinc.com/pdfiles/ETFEArticle.pdf+tefzel+removal&hl=en&gl=. . . ; May 18, 2006; 8 pages; Reprinted from Cleanroom Technology; Jul. 1999.

Micro Motion® Flowmeters Product Data Sheet (Jun. 2004), pp. 1-20.

Micro Motion ® T-Series Straight-Tube Mass Flow and Density Meters (Feb. 2004), pp. 1-20.

* cited by examiner

LINER FOR A FLOW METER

RELATED APPLICATIONS

This application claims priority to U.S. Provisional Application No. 60/677,458 filed May 4, 2005, U.S. Provisional Application No. 60/669,594 filed Apr. 8, 2005, U.S. Provisional Application No. 60/654,327 filed Feb. 18, 2005, and U.S. Provisional Application No. 60/588,242 filed Jul. 15, 2004. The entire contents of these provisional applications are hereby incorporated by reference in this application.

FIELD OF THE INVENTION

The invention relates to flow meters.

BACKGROUND OF THE INVENTION

Automated fill systems are used for transferring fluids from a reservoir to containers. Typically, these automated systems incorporate a flow meter to accurately control the amount of fluid introduced into each container, either by mass (weight) or volume. These systems are typically used in the pharmaceutical, biopharmaceutical, chemical, and food packaging industries. Likewise, the flow meters can also be used in other industries such as water, waste water, paper, energy, and petrochemical. The automated systems also generally include a stop valve controlled by the flow meter and a nozzle used to transfer the measured amount of fluid to a container.

One type of flow meter commonly used in these automated systems is a mass flow meter that measures flow characteristics based on the controlled generation of Coriolis forces. This type of mass flow meter is known and generally includes a titanium, stainless steel or other durable-material tube that extends centrally through the ends of a hollow enclosed cylinder and that facilitates fluid flow through the cylinder. The enclosed cylinder may contain nitrogen, helium or other suitable gases. To measure the mass flow rate through the tube, the tube is oscillated and, based on the actual measured tube oscillations, the flow characteristics can be computed. For example, when there is no mass flow through the tube, there is no computed phase difference between the applied oscillations and the measured oscillations. When there is mass flow, the tube oscillations is decreased at the inlet and accelerated at the outlet. As the mass flow rate increases, the phase difference also increases. The oscillation of the tube is measured using electrodynamic sensors at the inlet and outlet of the tube.

In many industries, such as pharmaceutical and biopharmaceutical, it is important to clean, sterilize, and validate permanent (i.e., non-disposable process piping) conduits within the system to prevent cross-contamination when the fluid reservoir is changed to introduce a different fluid through the system. This is referred to in the industry as changing batches. When changing batches, it is common to inject cleaning chemicals, pure water, and steam through the conduits to clean and sterilize them. Conduit portions may also have to be disassembled for cleaning and sterilization. Because the tube of the mass flow meter is part of the system, it must also be cleaned and sterilized (or replaced). The cleaning and sterilizing must also be validated prior to proceeding with the next batch. This results in a process that is time consuming, labor intensive and costly due to the associated downtime of the system.

Typically, systems have added additional valves and fittings at multiple locations along the conduits of the system to facilitate a clean-in-place (CIP) or steam-in-place (SIP) process and to allow cleaning and validation over smaller sections of the system. For example, if the entire system cannot be validated, the contamination can be isolated to a specific section and then only that specific section can be re-cleaned. In other words, isolation valves allow one or more sections of the flow path to be cut-off to allow for further cleaning of only the flow path sections that require cleaning. In this manner, isolation valves could be positioned upstream and downstream of the flow meter to define the flow meter tube as one isolated flow path. Although this arrangement simplifies cleaning, sterilizing, and validating between batches, it does not eliminate the costly, labor intensive, and time consuming cleaning process with respect to the flow meter.

Flow meters are also often used in applications that handle and transport caustic and/or corrosive materials (e.g., sewage treatment processes, chemical production processes, and the like). Over time, these harsh materials can corrode or otherwise degrade the tube in the flow meter, thereby requiring replacement of the flow meter. Such replacement is expensive and time consuming.

SUMMARY OF THE INVENTION

The present invention is directed to a disposable liner for a flow meter that can be replaced to prevent cross-contamination between batches, eliminate the need to clean, sterilize, and validate the tube within the flow meter, increase productivity of the filling system by decreasing system downtime, and reduce labor and other costs associated with the otherwise necessary cleaning and validation process. In addition, the disposable liner of the invention can be used to substantially reduce or eliminate corrosion or degradation of the flow tube in flow meters used in applications handling caustic and/or corrosive materials. Liners can be inserted and replaced as necessary to protect the integrity of the expensive flow tube.

One embodiment of the present invention is directed to a filling system including a fluid reservoir and a flow meter fluidly coupled together. The fluid reservoir supplies fluid to the flow meter and the flow meter measures flow characteristics. The flow meter also includes a tube associated with measuring the flow characteristics and a removable insert or liner positioned within the tube adapted to contain and transfer the fluid from the reservoir and through the flow meter.

In other embodiments, the filling system includes a stop valve and a nozzle fluidly coupled together with the flow meter. The flow meter controls the stop valve thereby allowing the nozzle to introduce only a measured amount of fluid to a container.

In some embodiments, the flow meter is a mass flow meter that measures flow characteristics based on the controlled generation of Coriolis forces. This tube of the mass flow meter extends centrally through the ends of a hollow enclosed cylinder. At least one electrodynamic sensor is positioned within the cylinder to measure flow characteristics based on the generation of Coriolis forces.

In other embodiments, the present invention contemplates the use of a removable, un-bonded liner in other types of flow meters (e.g., electromagnetic type flow meters). A removable liner used in other types of flow meters can also be inserted into and removed from the flow meter by itself apart from any supporting structure, thereby allowing the flow meter to operate either with or without the liner.

In yet other embodiments of the invention, the insert is a flexible tube. The flexible tube can be a non-reactive, pre-irradiated, plastic flexible tubing. The insert is inserted within the tube of the flow meter such that the outer surface of the insert substantially contacts the inside surface of the tube.

In yet further embodiments of the invention, the insert is a removable, formed or formable liner that can be shaped to conform to the inner surface of the tube in the flow meter, regardless of the size and configuration of the tube.

Other features and advantages of the invention will become apparent to those skilled in the art upon review of the following detailed description, claims, and drawings.

Figure 1:
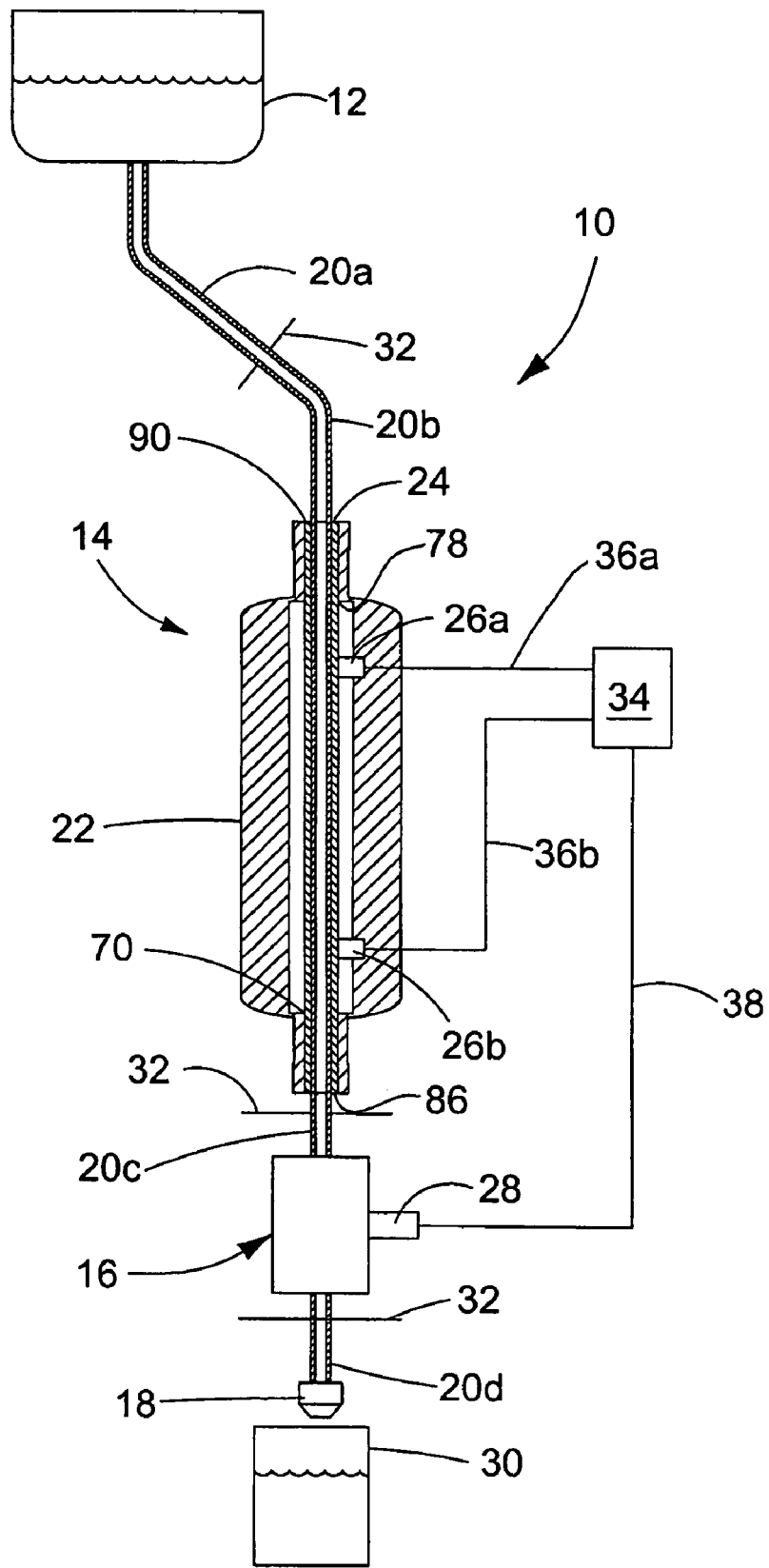
FIG. 1 is a schematic view of the filling system according to one embodiment of the present invention.
Figure 2:
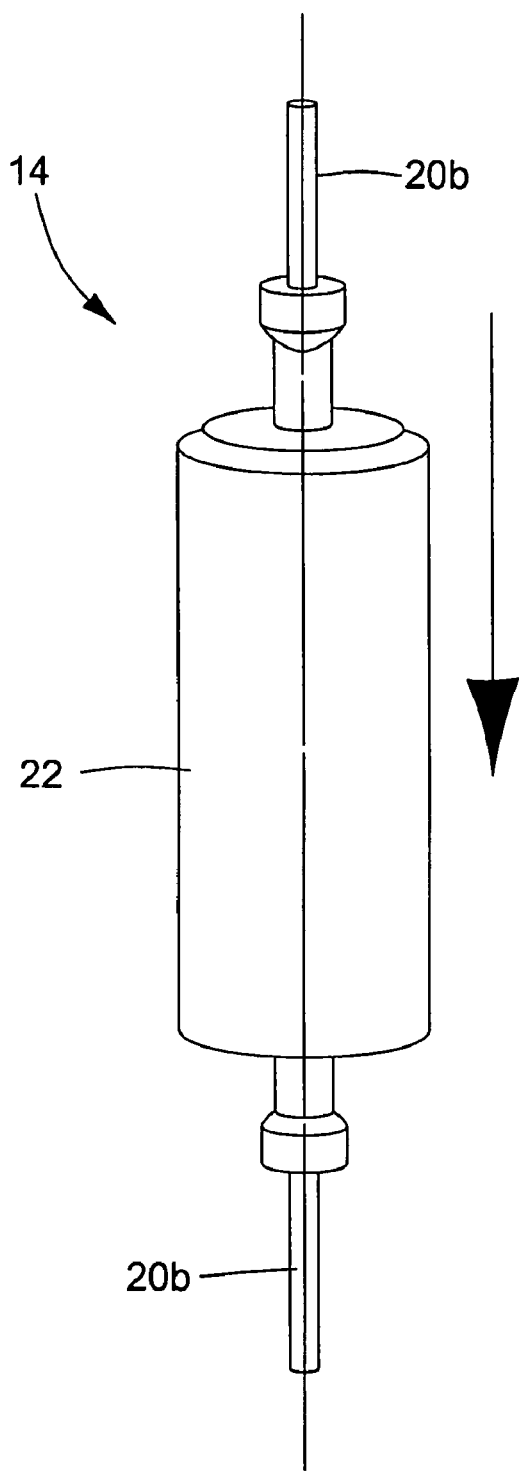
FIG. 2 is a perspective view of a flow meter of the filling system of FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

A filling system 10 according to one embodiment of the present invention is illustrated in FIG. 1. The filling system 10 includes a fluid reservoir 12, a flow meter 14, a stop valve 16, and a nozzle 18 fluidly coupled together. The fluid reservoir 12 is a container that holds a fluid. The fluid reservoir 12 can be a tank, a bag, a tub, or any vessel capable of holding a fluid. As used herein and in any appended claims, the term "fluid" is intended to include liquids, gases, and any other flowable solids or media capable of flowing or being passed through a flow meter (e.g., slurries, sludges, granular materials, sewage, heavy creams, pastes, and the like). The fluid in the reservoir 12 flows out of the reservoir 12 due to pressure applied within the reservoir 12. In other constructions, the system 10 could include a pump, such as a peristaltic pump, to move the fluid from the reservoir 12 and through the system 10. The filling system 10 can be used in pharmaceutical, biopharmaceutical, chemical, food packaging, and other industries. Likewise, the present invention contemplates use in flow meters used in other industries such as water, waste water, paper, energy, paint, cosmetic and petrochemical where the materials passing through the flow meters may be caustic and/or corrosive.

The flow meter 14 is fluidly coupled to the fluid reservoir 12 by conduit 20a. The flow meter 14 includes an enclosed hollow cylinder 22 and a centrally located tube 24 that extends through the ends of the cylinder 22 to define a passageway. The cylinder can contain nitrogen, helium or other gases to facilitate operation of the flow meter 14. An insert, liner, or conduit 20b is positioned within the passageway of the tube 24 and fluidly connects to the conduit 20a to selectively receive fluid from the fluid reservoir 12. The flow meter 14 also includes first and second electrodynamic sensors 26a, 26b that generate and send signals representative of the oscillations of the tube 24. In the illustrated embodiment, the flow meter 14 is a Coriolis flow meter such as a Coriolis flow meter available from Micro Motion, Endress+Hauser and others. The operation of a Coriolis flow measuring system is understood to one of ordinary skill in the art and is therefore not presented in detail in this application. In other embodiments, other flow measuring systems which include a tube for fluid transfer can also be used.

The conduit 20b can be a flexible, semi-rigid, or rigid plastic tubing. For example, the tubing can be made of polyethylene, polypropylene, polyolefins, nylon, thermoplastic elastomer, or any combination of these materials. Other formable materials that are resistant to corrosive fluids can also be used. In some embodiments, the outside wall of the conduit 20b substantially contacts a substantial portion of the entire interior surface of the tube 24. Making solid contact with the walls of the tube 24 allows a more accurate measurement to be taken by the sensors 26a, 26b as the fluid flows through the conduit 20b. The conduit 20b is capable of being sterilized prior to insertion into the passageway of the tube 24. In some embodiments, the conduit 20b can be irradiated, washed, chemically sterilized, or the like. In yet other embodiments, the conduit 20b is pre-sterilized and packaged to maintain sterility. The conduit 20b can be held within the tube 24 by frictional engagement between the tube 24 and the conduit 20b, or through mechanical fasteners such as clamps, screws, pressure, etc.

While the illustrated shape of the conduit 20b is an elongated tube, the conduit 20b could take on various other shapes (i.e., a formed or formable liner to accommodate substantially any tube configuration) that allow connection with conduits 20a, 20c and insertion into the tube 24. For example, there are numerous flow meter units that utilize different tube configurations. Multi-tube flow meters, and flow meters having curved and/or branched tubes are available. The present invention contemplates flexible, semi-rigid, and rigid liner configurations configured to work with substantially any flow meter tube configurations and constructions. The present invention also contemplates the use of a removable, un-bonded liner in other types of flow meters (e.g., electromagnetic type flow meters). As with the conduit 20b, a removable liner used in other types of flow meters can also be inserted into and removed from the flow meter by itself apart from any supporting structure, thereby allowing the flow meter to operate either with or without the liner.

Figure 3:
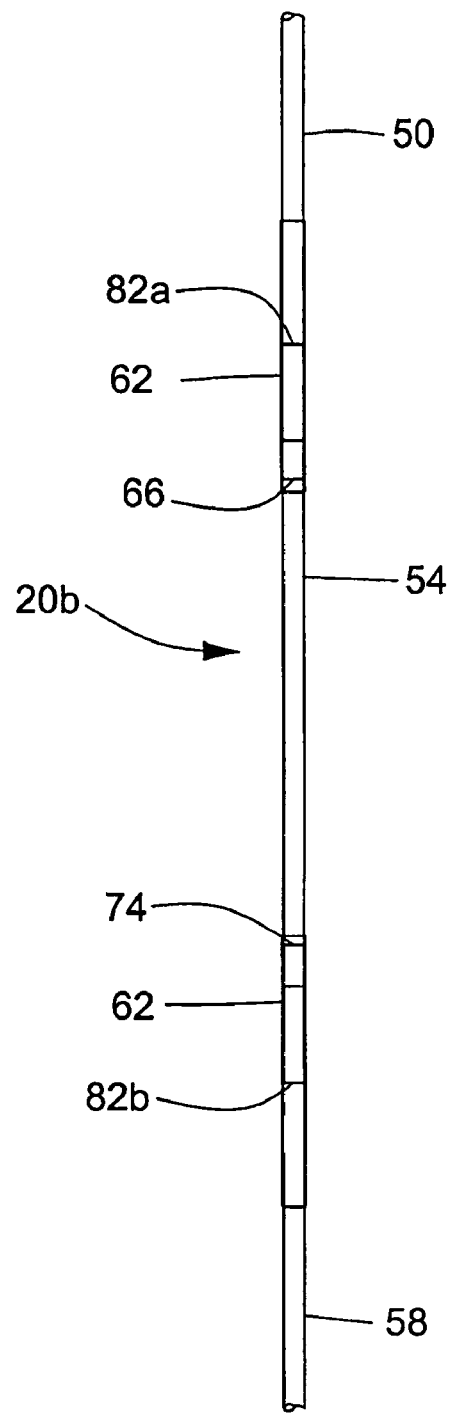
FIG. 3 is a plan view of a first liner embodiment for use in the filling system of FIG. 1.

FIG. 3 illustrates one embodiment of the conduit 20b in more detail. The illustrated conduit 20b of FIG. 3 includes a first portion 50, a second portion 54, and a third portion 58. The sizes and lengths of the portions 50, 54, and 58 will vary depending on the specific flow meter used, however, the second portion 54 is sized to fit within the tube 24. More specifically, the second portion 54 has an outside diameter that is substantially the same as or slightly larger than the inside diameter of the tube 24. This enables the outer surface of the second portion 54 to maintain contact with the inner surface of the tube 24 along substantially the entire length of the tube 24. In other embodiments, as will be discussed below, the outside diameter of the second portion 54 can be slightly smaller than the inside diameter of the tube 24. The second portion 54 has a low durometer value and a thin wall thickness so as to closely conform to and abut the inner surface of the tube 24.

The illustrated first and third portions 50, 58 are coupled to opposite ends of the second portion 54. The first and third portions 50, 58 extend out of the tube 24 and have a higher durometer value and greater wall thickness than the second portion 54 to accommodate the flow of pressurized fluid where there is no rigid structure surrounding the tube 24 (e.g., above and below the upper and lower ends of the tube 24 and cylinder 22 as shown in FIG. 1). As used herein and in any appended claims, the terms "up", "down", "upper", "lower", "above", "below", and the like are for the purposes of facilitating the description in light of the figures, and are not intended to imply or require any particular orientation of parts. If desired, the first and third portions 50, 58 can be reinforced with a braided or meshed material, or a removable solid fitment or fixture can be used at the ends of the cylinder 22 to help stabilize the first and third portions 50, 58. The illustrated conduit portions 50, 54, and 58 are made of commercially available thermoplastic elastomer C-FLEX medical grade tubing available from Consolidated Polymer Technologies, Inc. of Clearwater Fla., however, other suitable tubing, conduit, liner, and film materials can also be used. C-FLEX tubing is known for its bio-compatibility, temperature stability, moisture stability, sterile compatibility, and is made without toxic plasticizers, making it a good choice for pharmaceutical, chemical, and food packaging applications.

In the illustrated embodiment, one end of the first portion 50 is inserted into an end of the second portion 54, and the portions 50, 54 are coupled together to form a substantially leak-proof connection. A similar connection is formed between the second portion 54 and the third portion 58. In the illustrated embodiment, the portions 50, 54 and 54, 58 can be thermally bonded together using a length of shrink wrap or shrink tubing 62 positioned over the joints between the portions 50, 54, 58. Heat can be applied to the shrink tubing 62 using a heat gun or other suitable heat-emitting device to shrink the shrink tubing 62 for thermal bonding. Of course, other suitable joining techniques, such as fuse welding, RF welding, overmolding and the like can be used to join the portions 50, 54, 58 together. Alternatively, the portions 50, 54, 58 could be integrally extruded as one length of variable diameter, variable wall thickness, and variable durometer value conduit.

The conduit 20b is fluidly coupled to the stop valve 16 by conduit 20c. The stop valve 16 can include an actuator 28 that receives signals and is actuable to pinch the conduit 20c to restrict fluid flow through the conduit 20c. The actuator can be a pneumatic or hydraulic piston/cylinder assembly. Other valves for restricting the flow through the conduit 20c can also be used and are within the scope of the present invention.

The conduit 20c is fluidly coupled to the nozzle 18 by conduit 20d. The nozzle 18 directs fluid flow from the conduit 20d and into a container 30 such as bags, bottles, ampoules, and the like.

The conduits 20a, 20b, 20c, 20d define a flow path and can be coupled together by couplings 32 known to those of ordinary skill in the art. The flow path need not be separate conduits 20a, 20b, 20c, 20d coupled together by couplings, but instead can include a single integral conduit or any number of conduits coupled together to form the flow path of the filling system. For example, the conduit 20a, 20b can be integrally formed such that a single conduit extends from the fluid reservoir 12 through the flow meter 14. Likewise, the conduits 20c, 20d can be integrally formed such that a single conduit extends from the flow meter, through the valve stop, and to the nozzle. Any combination of adjacent conduits 20a, 20b, 20c, 20d can be integrally formed to form the flow path and reduce the number of separately-coupled conduits. One example of an entirely disposable fill line assembly that incorporates the conduits 20a, 20b, 20c, 20d and other components of the filling system 10 will be described below with respect to FIG. 4.

The filling system 10 also includes a controller 34 that includes an input electrically coupled to the first and second sensors 26a, 26b by wires 36a, 36b, respectively, to receive the signals from the sensors 26a, 26b, and an output that is electrically coupled to the stop valve 16 by wire 38 to send signals to the actuator 28. The controller 34 can include a keypad allowing an operator to input a parameter representative of a desired volume of fluid to be filled into each container 30.

Initially, prior to operation, the filling system 10 includes the fluid reservoir 12 and conduit 20a fluidly coupled together and the conduit 20c, stop valve 16, conduit 20d, and nozzle 18 fluidly coupled together. To prepare the flow meter 14 to be connected to the system, conduit 20b is inserted into the passageway of the tube 24. In some cases, it is desirable to have the exterior surface of the conduit 20b in contact with the interior surface of the tube 24. In order to insert the conduit 20b in this instance, the conduit 24 is stretched to reduce the outside diameter of the conduit 20b thereby allowing clearance for the conduit 20b to fit within the passageway of the tube 24. After the conduit 20b is inserted, some or all of the axial tension force can be removed from the conduit 20b such that the outside diameter of the conduit 20b returns to normal or closer to normal to frictionally engage the interior wall of the tube 24. If the outer diameter of the conduit 20b is substantially the same as or slightly larger than the inner diameter of the tube 24, the conduit 20b can remain under some tension to retain a slightly smaller outer diameter than the inner wall of the tube 24. Then, the pressurized fluid passing through the conduit 20b can expand the conduit 20b into engagement with the inner wall of the tube 24. In other embodiments, the conduit 20b can be cooled to shrink the diameter for insertion and allowed return to ambient temperature allowing the diameter to enlarge back to normal within the passageway of the tube 24. In yet other embodiments, the conduit 20b could be initially in a collapsed state for insertion into the tube 24. Once inserted, the conduit could be inflated or expanded using a gas, the liquid from the filling system 10, or other suitable means.

One method of installing the conduit 20b will now be described with respect to the conduit 20b illustrated in FIG. 3. First, one of the first or third portions 50, 58 is inserted into the upper end of the tube 24 and fed through the tube 24 until the second portion 54 is properly positioned within the tube 24. In the illustrated embodiment, the second portion 54 is properly positioned within the tube 24 when the interface 66 between the first and second portions 50, 54 is generally aligned with a weld point 70 (see FIG. 1) where the tube 24 is welded into the hollow cylinder 22. Likewise, the interface 74 between the second and third portions 54, 58 will be generally aligned with a weld point 78 where the tube 24 is welded into the hollow cylinder 22. It is believed that this alignment technique substantially prevents the conduit 20b from altering or hindering the oscillation of the tube 24 in a non-linear manner, which could impact the accuracy of the flow meter readings. Instead, with the conduit 20b properly positioned within the tube 24, the effect of the conduit 20b on the oscillation of tube 24 becomes substantially linear. As a result, a simple calibration may be performed to account for the presence of the conduit 20b within the tube 24. In addition to the methods described above for facilitating inserting the conduit 20b into the tube, a friction-reducing agent (e.g., a powder, lubricants, alcohol, and the like) can be applied to the outer surface of the conduit 20b to facilitate insertion into the tube 24.

Indicia 82a, 82b in the form of markings, notches, ribs, detents, bumps, and the like can be provided on the first and third portions 50, 58, respectively, to facilitate installation of the conduit 20b. Specifically, the indicia 82a, 82b can be positioned on the conduit 20b to indicate to the installer how far to pull the conduit 20b through the tube 24. For example, the indicia 82a, 82b can be located on the first and third portions 50, 58 so that when the indicia 82a aligns with a fixed point 86 (see FIG. 1) on the cylinder 22 and/or tube 24 and the indicia 82b aligns with a fixed point 90 (see FIG. 1) on the cylinder 22 and/or tube 24, the conduit 20b is properly positioned within the tube 24. If the indicia 82a, 82b take the form of ribs or bumps, the ribs or bumps can act as stops that fit against and/or engage the fixed points 86, 90. Of course, the fixed points 86 and 90 and the locations of the indicia 82a, 82b could vary. For example, the fixed points could alternatively be at clamps, fitments, fixtures, or other fixed structure adjacent the ends of the cylinder 22, and the indicia could be positioned at the appropriate corresponding location on the conduit.

When the conduit 20b is properly inserted within the tube 24, the conduit 20b can be connected to the conduits 20a, 20c.

Figure 4:
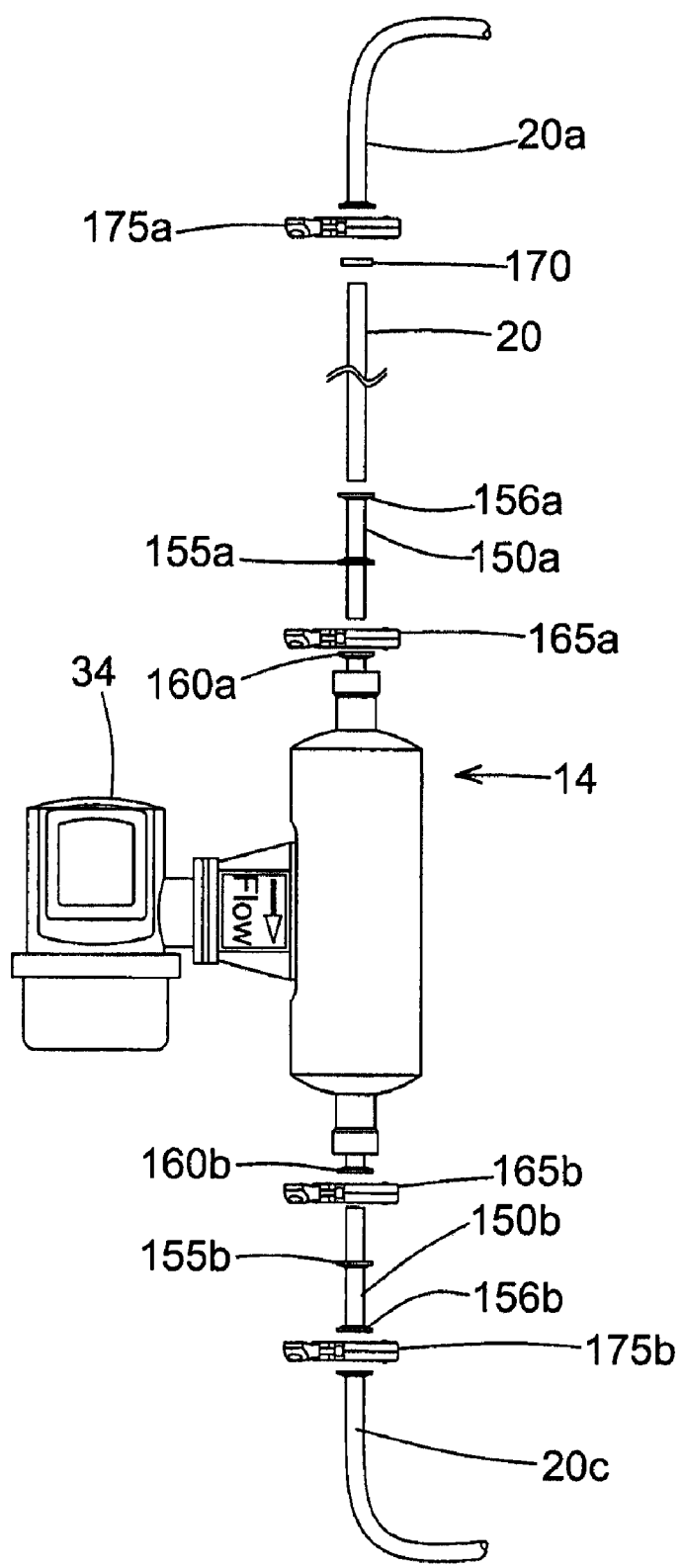
FIG. 4 is an exploded view of a filling system illustrating the components used for installing a second embodiment of a liner.

In other constructions, the conduit 20b can be connected to or integrally formed with one or more of the other conduits 20a, 20c, 20d prior to insertion into the tube 24, as discussed below with respect to FIG. 4.

After the system 10 is fully assembled, operation of the system 10 begins with the stop valve 16 pinching the conduit 20c such that the fluid flow through the flow path is restricted. A container 30 is positioned in operational relationship with the nozzle 18 such that fluid exiting the nozzle 18 enters the container 30. After the container 30 is properly positioned, the controller 34 sends a signal to the actuator 28 to move out of contact with the conduit 20c such that fluid from the reservoir 12 is allowed to flow through conduits 20a, 20b, 20c, and 20d, out the nozzle 18, and into the container 30. Due to the presence of the conduit 20b, the fluid does not contact the inner surface of the tube 24.

As the flow of fluid begins through the flow path, the sensors 26a, 26b generate and send signals representative of the oscillations of the tube 24. The controller 34 receives the signals from the sensors 26a, 26b and calculates the amount of fluid that flows through the flow meter 14 based, at least partially, on the received signals and the Coriolis principle. When the controller 34 identifies that the desired, preprogrammed amount of fluid has moved through the flow meter 14, the controller 34 sends a signal to the actuator 28 of the stop valve 16. The actuator 28 will pinch the conduit 20c closed in response to receiving the signal from the controller 34.

After the stop valve 16 is closed and the container 30 is filled to the desired volume, the container 30 can be capped or sealed and removed from the system 10. The next container is then introduced into the system 10 to replace the filled container 30 and the process of filling the container repeats itself until the reservoir 12 is emptied or a desired number of containers have been filled.

At such time, a new batch begins by replacing the reservoir 12 with a new reservoir containing a new fluid. Rather than clean, sterilize, and validate the tube 24 of the flow meter 14 (as discussed in the Background), the conduit 20b can be replaced. To replace the conduit 20b, the conduit 20b is disconnected from the conduits 20a, 20c. The used conduit 20b is then removed from the tube 24 by pulling it through the tube 24. In most cases, the flow meter 14 need not be disassembled to remove the tube 24 from the flow meter 14 in order to remove the conduit 20b. The end of the conduit 20b can be capped to prevent any fluid from spilling into the tube 24 as the conduit 20b is being pulled through the tube 24. A new sterilized conduit similar to conduit 20b is positioned within the passageway of the tube 24 in the manner described above. As with removing the conduit 20b, in most cases, the flow meter 14 need not be disassembled to remove the tube 24 from the flow meter 14 in order to insert the new conduit 20b. When the new conduit is inserted, the new conduit is connected to the conduits 20a, 20c, which have either been replaced by corresponding sterile conduits or cleaned, sterilized, and validated.

After the conduit 20b is removed from the tube 24, it is intended to be discarded. In some non-sterile applications, a disposable liner may be individually cleaned, sterilized, validated and reused until its useful life has expired. For example, if the conduit 20b is a piece of flexible plastic tubing, the cost is minimal and therefore it can be discarded or recycled and replaced with a new pre-sterilized conduit. In applications in which caustic and/or corrosive materials are run through a flow meter, the conduit 20b can be used to protect the tube 24 of the flow meter. In such cases, the conduit 20b acts as a protective and disposable liner that after time may degrade due to the contact with the caustic and/or corrosive chemicals. However, the conduit can be replaced as needed to preserve the integrity of the more expensive tube 24 inside the flow meter. Using the disposable conduit 20b as a liner for the tube 24 may eliminate the need for periodic disassembly of the flow meter 14 in order to replace an unprotected, non-sterile or damaged tube 24, or possibly the need for completely replacing the flow meter 14 if an unprotected tube 24 is damaged. In addition, the use of the disposable conduit 20b is not a permanent alteration to the flow meter 14 and does not alter the functionality of the flow meter 14 if the flow meter 14 is later used without the conduit 20b. With this invention the flow meter tube 24 remains unchanged and will function with or without the liner, but may need recalibration.

Another embodiment of the a conduit 20 and a method of installing the conduit 20 into the flow meter 14 will now be described with reference to FIGS. 4-11, where the liner or conduit 20 replaces the conduit 20b described earlier. In this embodiment, the conduit 20 is made from a single piece of C-FLEX medical grade tubing. While various durometer values of the C-FLEX tubing can be used (e.g., tubing with durometer values ranging from 18-70 on the A scale), it has been found that a length of C-FLEX tubing with a durometer value of 50 on the A scale provides accurate results. Additionally, the illustrated tubing has an outside diameter that is the same as or preferably smaller than the inner diameter of the tube 24.

First, an appropriate length of the C-FLEX tubing is provided (e.g., cut to length) to form the conduit 20 to fit within the tube 24. The specific length of the conduit 20 will vary depending on the flow meter 14 being used. The outer surface of the conduit 20 can be coated with a lubricant or material that will reduce friction and adhesion when the conduit 20 is inserted into the tube 24. In the illustrated embodiment, the conduit 20 can be rolled in or otherwise coated with suitable sterile and/or non-toxic medical grade lubricants, talcum powder, greases, sprays, or similar products that will reduce friction and adhesion. Any excess lubricant or friction reducing material can be removed from the conduit 20 prior to installation.

Next, one end of the conduit 20 can be secured to a rod or other elongated member that can be used to insert and pull the conduit 20 through the tube 24 of the flow meter 14. For example, one end of the conduit 20 can be taped or otherwise coupled to the rod. However, other means for securing the conduit 20 to the rod can also be used. Any suitable device and method for inserting the conduit 20 into the tube 24 can be employed, and care should be taken not to damage the tube 24.

Prior to inserting the conduit 20 into the tube 24, the tube 24 can be cleaned with a brush, a soft cloth, or other suitable cleaning device. Alternatively or additionally, pressurized air could also be blown through the tube 24 for cleaning purposes. In one embodiment, a paper cloth can be attached to an elongated rod that is pulled through the tube 24 to clean the tube 24.

Figure 5:
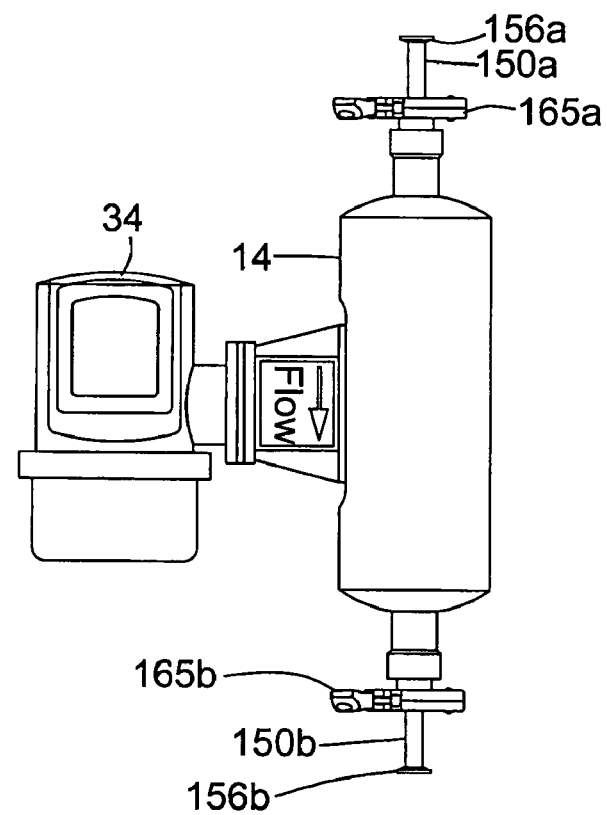
FIG. 5 illustrates the filling system of FIG. 4 in a partially assembled state.

Next, insert fixtures 150a, 150b for the flow meter 14 are placed into the respective openings at the top and bottom of the cylinder 22 of the flow meter 14 (see FIG. 5). In the illustrated embodiment, the fixtures 150a, 150b are inserted until a flange 155a, 155b on the respective fixture 150a, 150b abuts a flange 160a, 160b or abutment surface on the end of the cylinder 22. The fixtures 150a, 150b are then secured in place using a clamp 165 or other suitable securing device. In the illustrated embodiment, conventional sanitary clamps 165a, 165b are secured at both ends of the cylinder 22 to couple the flange 155a, 155b on the insert fixture 150a, 150b and the flange 160a, 160b on the respective end of the cylinder 22 together. In other embodiments, the insert fixtures 150a, 150b may be permanently secured to or integrally formed with the cylinder 22 of the flow meter 14.

Figure 6:
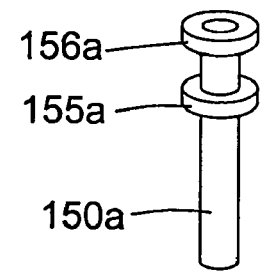
FIG. 6 is an enlarged perspective view showing the insert fixtures of the filling system of FIG. 4.
Figure 6:
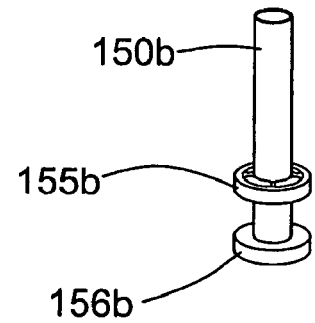
Figure 7:
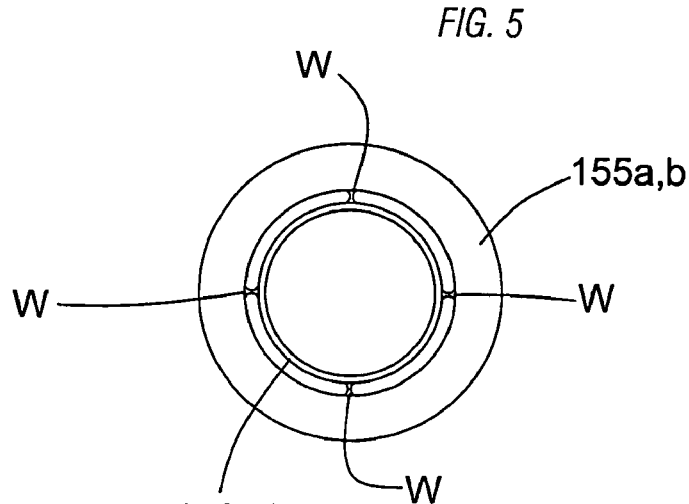
FIG. 7 is a bottom view of the insert fixtures of FIG. 6.

FIGS. 6 and 7 further illustrate the insert fixtures 150a, 150b, which in the illustrated embodiment are substantially identical. The tubular body portion of the insert fixtures 150a, 150b have an outer diameter that is smaller than the inner diameter of the tube 24, thereby providing an annular gap between the tubular body portion of the insert fixture 150a, 150b and the inner wall of the tube 24. This gap prevents the fixtures 150a, 150b from contacting the tube 24, thereby isolating the fixtures 150a, 150b from the tube to ensure that the fixtures 150a, 150b do not substantially alter the excitation frequency of the tube 24. Isolating the fixtures 150a, 150b from the tube 24 helps to achieve accurate and repeatable measuring results. While the length of the fixtures 150a, 150b can vary depending on the flow meter 14, the fixtures 150a, 150b should stop short of reaching the sensors 26a, 26b when inserted into the tube 24.

The fixtures 150a, 150b also facilitate the repeatability of installing the conduit 20 into the tube 24. Using the fixtures 150a, 150b helps ensure that every time a new conduit 20 is installed, the conduit 20 will contact the inner wall of the tube 24 at substantially the same location. This helps to achieve accurate and repeatable results for the flow meter 14.

The illustrated fixtures 150a, 150b are made of a metal such as stainless steel. However, other alloys or disposable plastics could also be used for the fixtures 150a, 150b. If the fixtures 150a, 150b are made from a disposable plastic material, the fixtures 150a, 150b could be part of a disposable fill line system like that shown and described below with respect to FIGS. 15 and 18 for single use aseptic or sterile applications.

With the fixtures 150a, 150b inserted, the conduit 20 can be inserted into the tube 24 using the elongated rod or other installation device. In the illustrated embodiment, the rod is inserted into the opening in the upper insert fixture 150a, passed through the tube 24, and exits the cylinder through the opening in the lower insert fixture 150b. Of course, the rod could also be inserted into the opening in the lower insert fixture 150b first, passed through the tube 24 in an upward direction, and then exit the cylinder 22 through the opening in the upper insert fixture 150a. The free or unsecured end of the conduit 20 is then wrapped over a second flange 156a of the upper insert fixture 150a to secure the upper end of the conduit 20 to the upper insert fixture 150a (shown schematically in FIG. 8). Next, the rod is pulled through the tube 24 until the end of the conduit 20 that is secured to the rod appears from the opening in the lower insert fixture 150b. The conduit 20 will be slightly stretched (i.e., under slight tension) at this point, and will remain slightly stretched when installed. While firmly grasping the end of the conduit 20, the tape or other securing means can be removed so that the rod can be removed from the conduit 20 and completely withdrawn from the cylinder 22. The lower end of the conduit 20 is then wrapped over a second flange 156b of the lower insert fixture 150b to secure the lower end of the conduit 20 to the lower insert fixture 150b (shown schematically in FIG. 9).

Now that the conduit 20 is positioned in the tube 24, the appropriate lines can be connected to the upper and lower insert fixtures 150a, 150b. First, a gasket 170 can be placed on the flange 156a of the upper (and in this case "inlet") insert fixture 150a (see FIG. 10). Next, the fluid supply line or conduit 20a is connected to the inlet insert fixture 150a using a conventional sanitary clamp 175a or other suitable connector. The same operations are then repeated to connect the outlet line or conduit 20c and/or 20d to the lower or "outlet" insert fixture 150b.

Next, the fluid supply to the flow meter 14 is turned on to supply pressurized fluid to the conduits 20a, 20, and 20c/20d. The pressurized fluid passing through the conduit 20 begins to expand and/or form the conduit 20 to the inner wall of the tube 24. Fluids and gases (e.g., air) that are trapped between the conduit 20 and the tube 24 begin to be purged from the system 10 as the conduit 20 expands and conforms to the shape of the inner wall of the tube 24. More specifically, and with reference to FIG. 11, the gap between the outer diameter of the fixtures 150a, 150b and the inner diameter of the tube 24 provides a pathway for air trapped between the conduit 20 and the tube 24 to be purged. Air can travel between the tubular body portions of the fixtures 150a, 150b and the inner wall of the tube 24 toward the flanges 155a, 155b (as generally represented by the flow lines A in FIG. 11). Referring again to FIG. 7, the flanges 155a, 155b are coupled to the tubular body portion of the respective fixtures 150a, 150b in a manner that provides one or more air gaps for the air to escape. As shown in FIG. 7, the flanges 155a, 155b are welded to the body portion of the fixtures 150a, 150b in four places W, leaving four arcuate gaps between the flanges 155a, 155b and the tubular body portions of the fixtures 150a, 150b through which air can escape. Of course, fewer or more welds W can be used.

Air is also purged from inside the fluid supply line or conduit 20a, the conduit 20, and the conduit 20c/20d by running fluid through the conduits 20a, 20, and 20c/20d for at least about three seconds.

Once the excitation current of the flow meter 14 stabilizes, the pressure in the fluid supply line or conduit 20a is increased to further expand and form the conduit 20 to the inner wall of the tube 24. After some time has passed, the conduit 20 will completely conform to the inner wall of the tube 24 so that substantially no air is trapped between the inner wall of the tube 24 and the conduit 20. Because the conduit 20 will have expanded against the inner wall of the tube 24, there should not be any wrinkles, folds, or other irregularities in the conduit 20. Any air that was trapped between the inner wall of the tube 24 and the conduit 20 will have been completely purged and evacuated, and will have exited the system 10 in the manner described above, thereby enabling the flow meter 14 with the removable conduit 20 to provide accurate and repeatable measurements.

Figure 12:
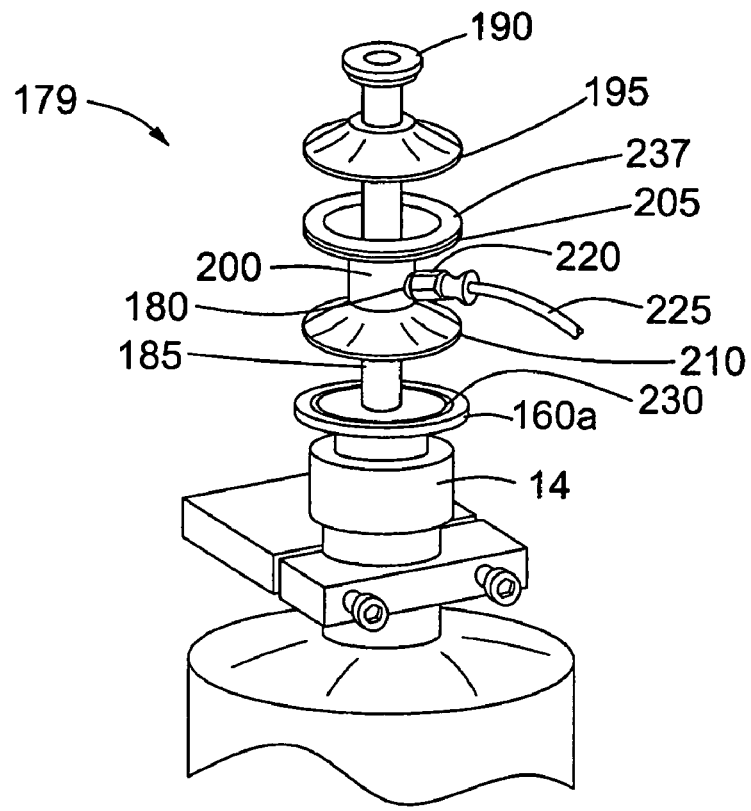
FIG. 12 is an exploded partial perspective view illustrating a vacuum port assembly embodiment for use with the filling system.
Figure 13:
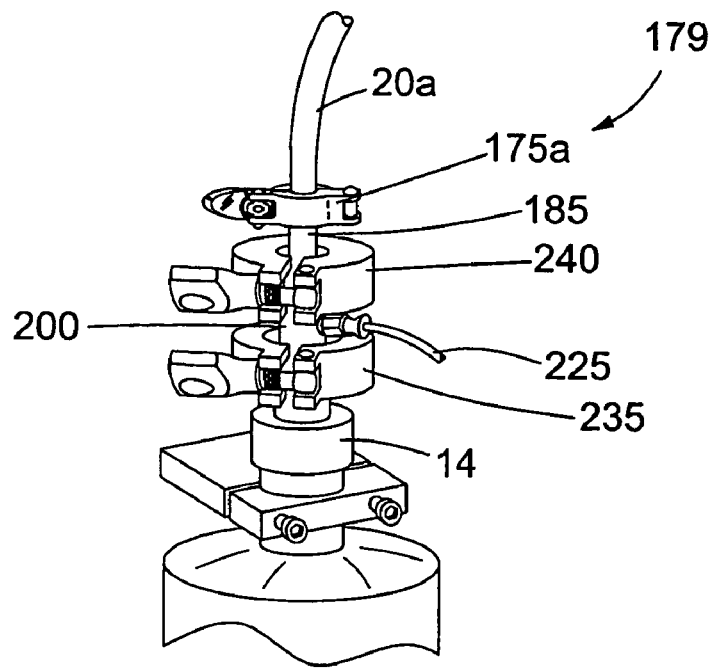
FIG. 13 is a partial perspective view showing the vacuum port assembly of FIG. 12 fully assembled.

As an alternative, or in addition to air purging steps discussed above, a vacuum port could be attached to one or both of the insert fixtures 150a, 150b or otherwise integrally formed with the flow meter 14 and could be used to evacuate the air between the conduit 20 and the tube 24. FIGS. 12 and 13 illustrate one possible assembly 179 that includes a vacuum port 180a that facilitates the evacuation of the space between the conduit 20 and the tube 24. As illustrated in FIG. 12 the assembly 179 includes an insertion fixture 185 that includes a flange 190 at one end and a collar 195 between the first end and a second end. The flange 190 is similar to the flanges 156a, 156b described above and will not be described in detail. The collar 195 is a substantially disk-shaped portion that is formed as part of the insertion fixture 185 or is fixedly attached (e.g., welded, glued, soldered, brazed, etc.) to the insertion fixture 185. A spool 200 includes an upper spool flange 205, a lower spool flange 210, and an internal aperture that allows the spool 200 to slide freely over the insertion fixture 185. The vacuum port 180a extends from the outer surface of the spool to the internal aperture to provide fluid communication therebetween. A hose fitting 220, such as a threaded compression fitting, engages the vacuum port 180a and provides for the connection of a vacuum conduit 225 that extends from the hose fitting 220 to a vacuum source, such as a vacuum pump.

The insertion fixture 185, with the spool 200 positioned as illustrated in FIGS. 12 and 13, fits within a top opening in the flow meter 14 such that the insertion fixture 185 enters the flow meter 14, and in some constructions enters the tube 24. The lower spool flange 210 slides into a mating position relative to the cylinder flange 160a. In some constructions, a gasket, o-ring, or other resilient member 230 is positioned between the flange 160a and the lower spool flange 210 to assure a substantially air-tight seal. A clamp 235, shown in FIG. 13, engages the flange 160a and the lower spool flange 210 and retains them in a sealed position. Once the clamp 235 is engaged, a vacuum flow path extends from the exterior of the spool 200 to the interior of the spool 200, along the outer surface of the insertion fixture 185 to the interior surface of the tube 24. With the liner 20 positioned as previously described, the vacuum path extends into the space between the liner 20b and the tube 24.

The collar 195, shown in FIG. 12, slides into an engagement position with the upper spool flange 205. As illustrated in FIG. 12, a resilient member 237 such as a gasket, o-ring, or other sealing device can be positioned between the upper spool flange 205 and the collar 195 to provide a substantially air-tight seal. An upper clamp 240 (shown in FIG. 13) engages the upper spool flange 205 and the collar 195 and compresses the sealing device 237 to establish a substantially air-tight seal. Thus, the vacuum path is sealed from the atmosphere and extends into the space between the tube 24 and the liner 20 such that the vacuum source is able to draw gas (e.g., air) from the space between the tube 24 and the liner 20.

Figure 8:
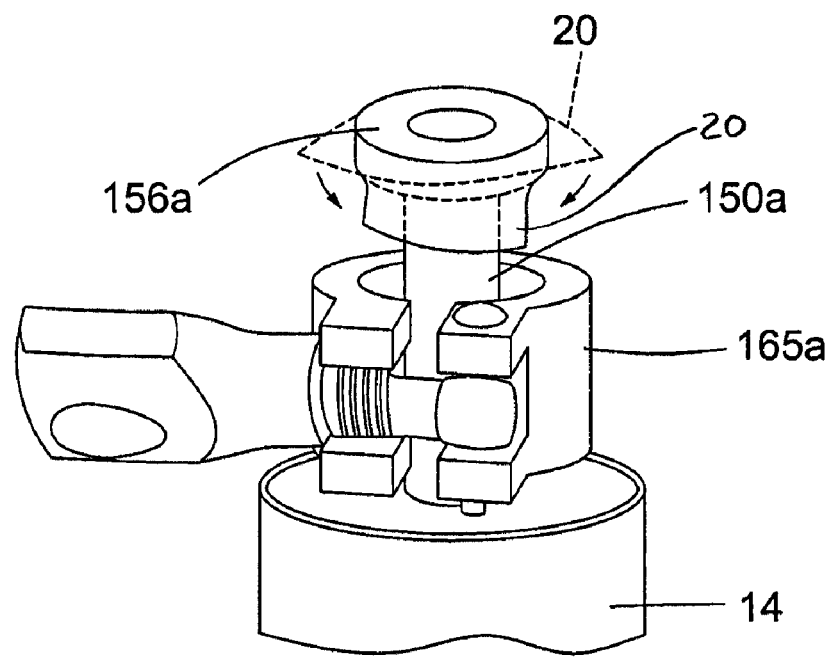
FIG. 8 is a partial perspective view showing the liner being secured in place over the upper insert fixture.
Figure 9:
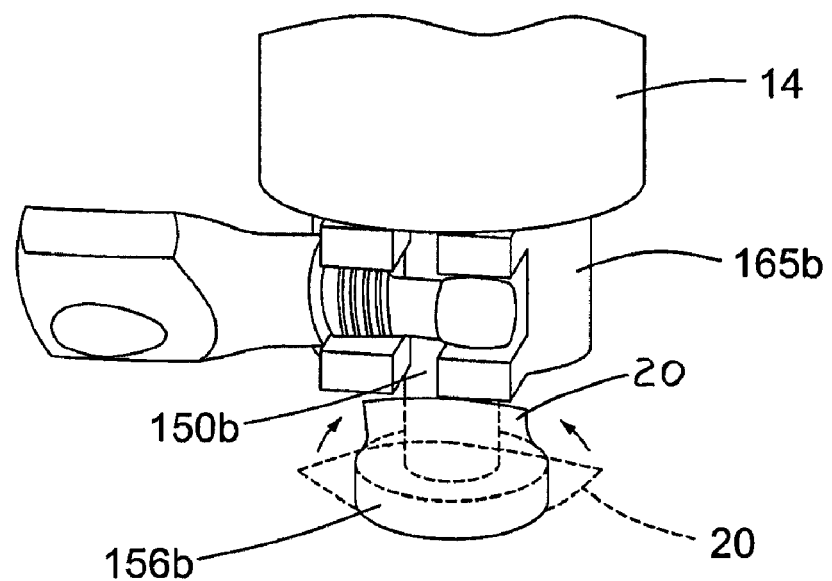
FIG. 9 is a partial perspective view showing the liner being secured in place over the lower insert fixture.
Figure 10:
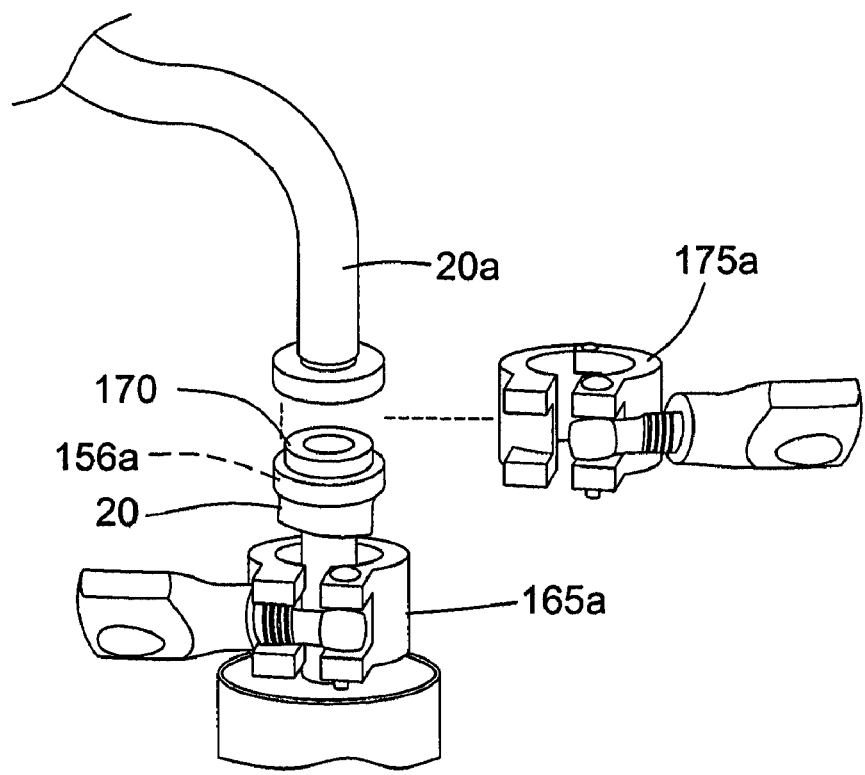
FIG. 10 is an exploded partial perspective view showing the connection between the inlet line of the filling system and the upper insert fixture.
Figure 11:
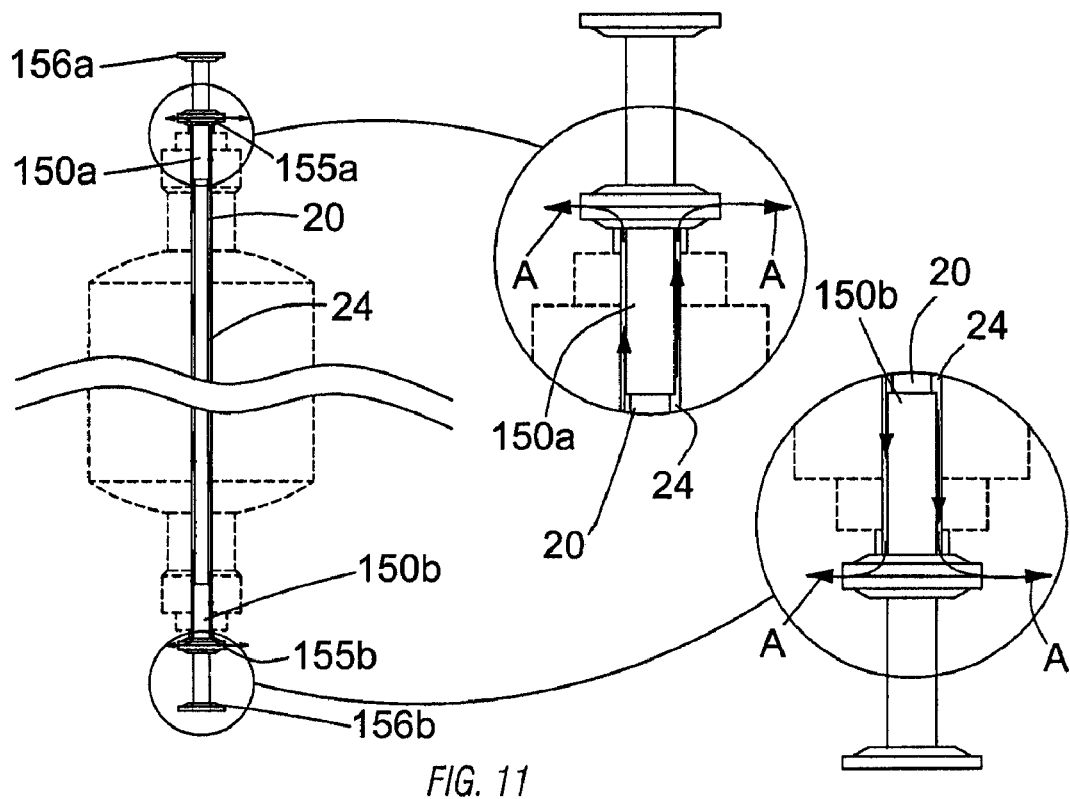
FIG. 11 is schematic view illustrating the air purge pathways for the filling system of FIG. 4.

The liner 20 extends out the top of the insertion fixture 185 and engages the flange 190 as was described with regard to FIG. 8 above. The gasket 170 can be positioned on top of the liner 20 and the flange 190 as shown in FIG. 10. The liquid supply line 20a is then positioned on top of the gasket 170 and a supply clamp 175a is positioned to sealably couple the liquid supply line 20a to the liner 20 and the flange 190 of the insertion fixture 185, as illustrated in FIG. 13.

Figure 14:
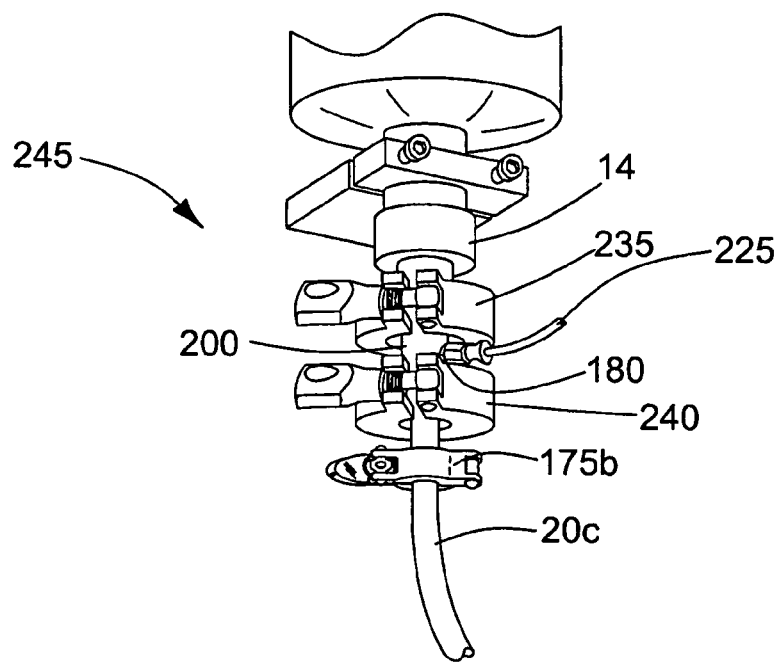
FIG. 14 is a partial perspective view showing a second vacuum port assembly assembled with the filling system.

FIG. 14 illustrates a vacuum assembly 245 similar to the assembly 179 described with regard to FIGS. 12 and 13. However, the vacuum assembly 245 of FIG. 14 attaches to the outlet end of the flow meter 14 rather than to the inlet end. The outlet conduit 20c attaches to the vacuum assembly 245 using a clamp 175b that is similar to the clamp 175a and in a manner similar to that described above. Some constructions may include an inlet vacuum assembly 179, an outlet vacuum assembly 245, or both, as may be required by the particular application. Additionally, other purging devices or assemblies can be also be used.

Once the air has been evacuated from between the conduit 20 and the tube 24, the pressure in the supply line or conduit 20a can be adjusted to the desired filling pressure and batching of the fluid can begin. While two methods of venting or evacuating the air from between the conduit 20 and the tube 24 have been described above in detail with respect to the fixtures 150a, 150b and 185, it should be noted that other techniques for purging the air can also be used to achieve the accurate and repeatable results desired when using the replaceable conduit or liner 20.

Figure 15:
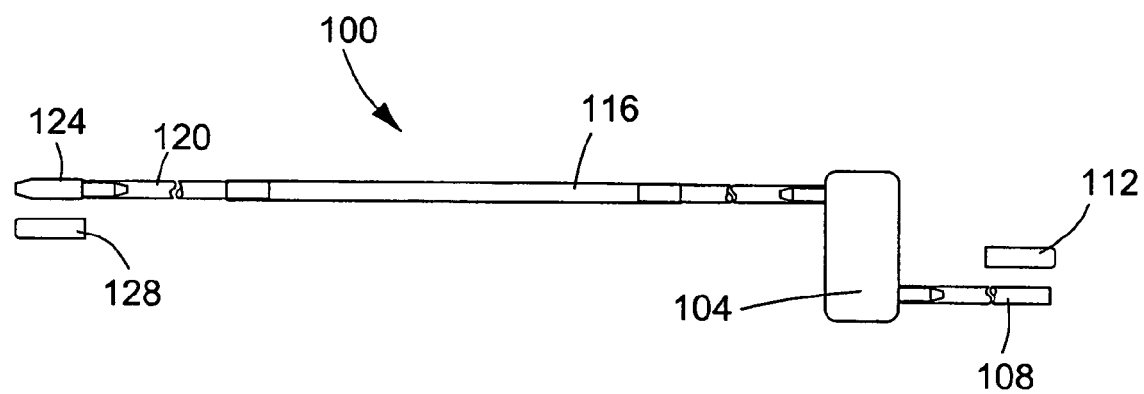
FIG. 15 is a plan view of a fill line incorporating the liner of FIG. 3.

FIG. 15 illustrates one example of a disposable fill line assembly 100 that incorporates the conduits 20a, 20b or 20, 20c, and 20d into a single assembly. The fill line assembly 100 can also include other components of the filling system 10, such as the nozzle 18. In addition, the fill line assembly 100 can be configured to accept an aseptic filter 104 or other device that might be useful depending on the particular fill system application.

The fill line assembly 100 includes a first portion 108 corresponding to the conduit 20a shown in FIG. 1. A removable cap 112 can be placed on the end of the first portion 108 until the first portion 108 is to be coupled to the reservoir 12. The length of the first portion 108 can be varied as desired depending on the specific filling system used. A second end of the first portion 108 is illustrated as being connectable to the aseptic filter 104, however, if no filter 104 or similar device is needed, the second end of the first portion 108 can be coupled directly to or integrally formed with a second portion 116 of the assembly 100. The second portion 116 corresponds to the conduit 20b or the conduit 20, including the portion of the conduit that is received within the tube 24 of the flow meter 14. The construction of the second portion 116 is generally the same as described above with respect to FIG. 3, although the length and configuration of the second portion 116 can vary depending on the specific filling system used. The end of the second portion 116 opposite the first portion 108 is coupled directly to or integrally formed with a third portion 120 corresponding to the conduits 20c and 20d. The length of the third portion 120 can be varied as needed. A nozzle 124 is coupled to an end of the third portion 120, and a removable nozzle cap 128 can be placed on the nozzle 124 until the fill line assembly 100 is installed and ready for use in the filling system 10.

The portions 108, 116, and 120 of the fill line assembly can be made of the same materials and in the same manners as discussed above, and in the illustrated embodiment are made of C-FLEX tubing. The nozzle 124, caps 112 and 128, and the filter 104 can also be made from plastics or other materials suitable for use in sterile environments. The entire fill line assembly 100 can be packaged in a single package, and if the fill line assembly 100 is to be used in a sterile application, the entire package can be sterilized via an irradiation process, an ethylene oxide treatment, or other suitable sterilization techniques. The fill line assembly 100 could be used once, disposed of, and then a new, sterilized fill line assembly 100 could be inserted for use in the filling system 10, thereby eliminating the need for CIP or SIP processes and validation processes.

The components of the fill line assembly 100 are sized and configured to permit insertion into the components of the filling system 10. For example, at least a portion of the fill line assembly 100 is sized to pass through the stop valve 16, while the same or another portion of the fill line assembly 100 is sized to pass through the tube 24. Similar methods as those described above can be used to facilitate inserting the fill line assembly 100 into filling system 10. If no filter 104 is incorporated into the fill line assembly 100, at least one of the nozzle 124, the cap 128, and the cap 112 can be sized and configured to permit passage through the tube 24 and the stop valve 16. Achieving the proper positioning of the second portion 116 within the tube 24 can occur in substantially the same manner as discussed above with respect to positioning the conduit 20b or the conduit 20 inside the tube 24.

It is to be understood that the disposable fill line assembly 100 can be used with, or modified to be used with, other filling systems that may not utilize a flow meter, but rather that incorporate other fluid handling devices. As used herein and in any appended claims, the term "fluid handling device" means a device associated with a fluid handling system and through which the fluid pathway passes, regardless of whether the fluid handling device acts on the fluid and/or fluid pathway, or passively monitors or analyzes the fluid and/or the fluid pathway. For example, some known filling systems utilize peristaltic pumps or other fluid handling devices for filling containers (e.g., bags) with the desired fluid in the filling system. In such an application, the disposable fill line assembly 100 can be used to reduce or eliminate the need for cleaning and validating the components of the disposable fill line assembly 100. Any desired number of conduit portions and any other desired components can be used and interconnected as needed depending on the particular filling system. Preferably, a fill line assembly designed for use in a specific filling system will be pre-sterilized and packaged to be used as a single-use, disposable fill line assembly. By incorporating a disposable nozzle 124 into the disposable fill line, in place of a metal nozzle that must be cleaned and validated between batches, the time and cost associated with changing batches can be greatly reduced.

Figure 16:
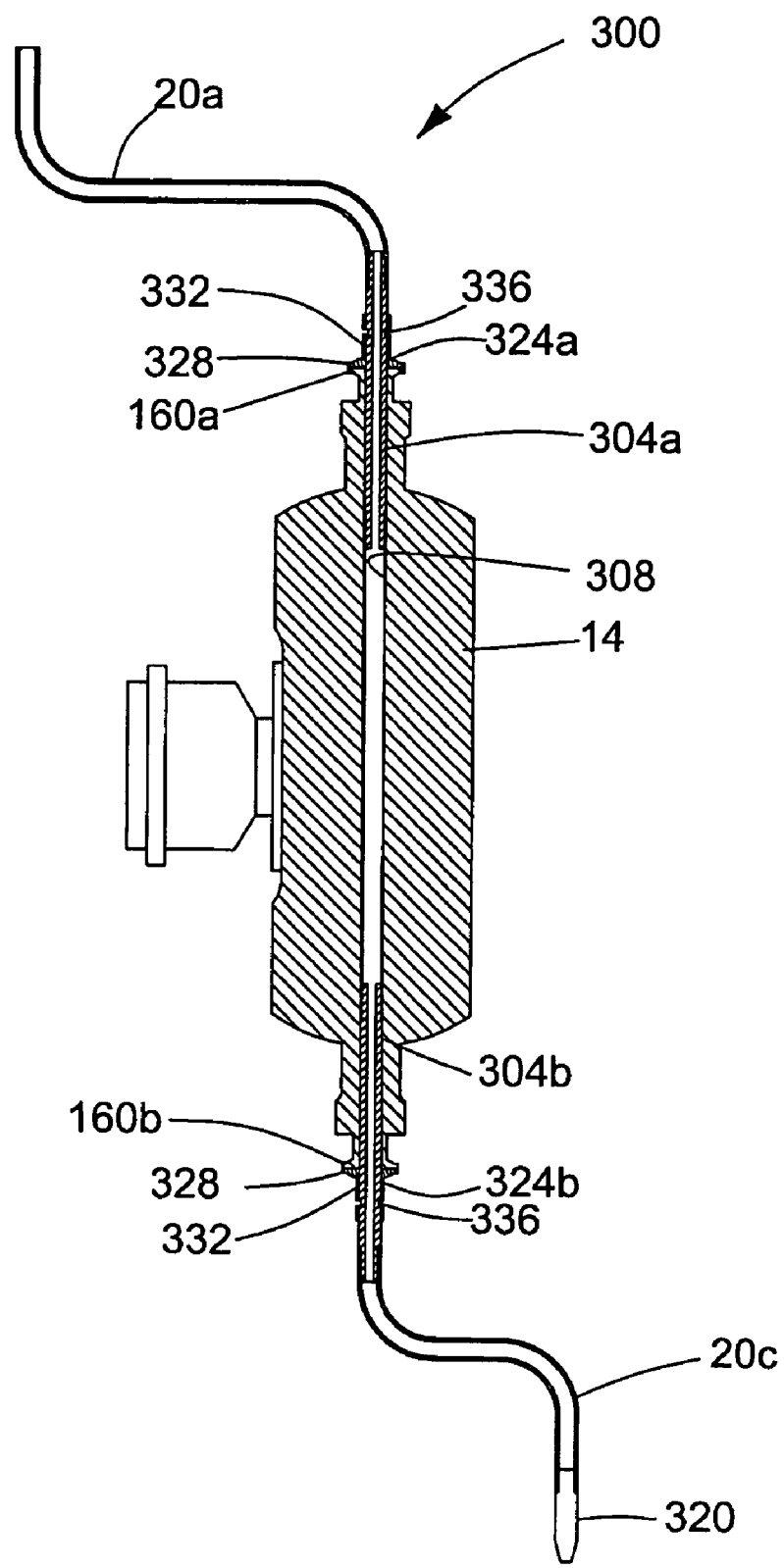
FIG. 16 is a section view of a filling system incorporating a disposable fill line that is a third embodiment of a liner.
Figure 17:
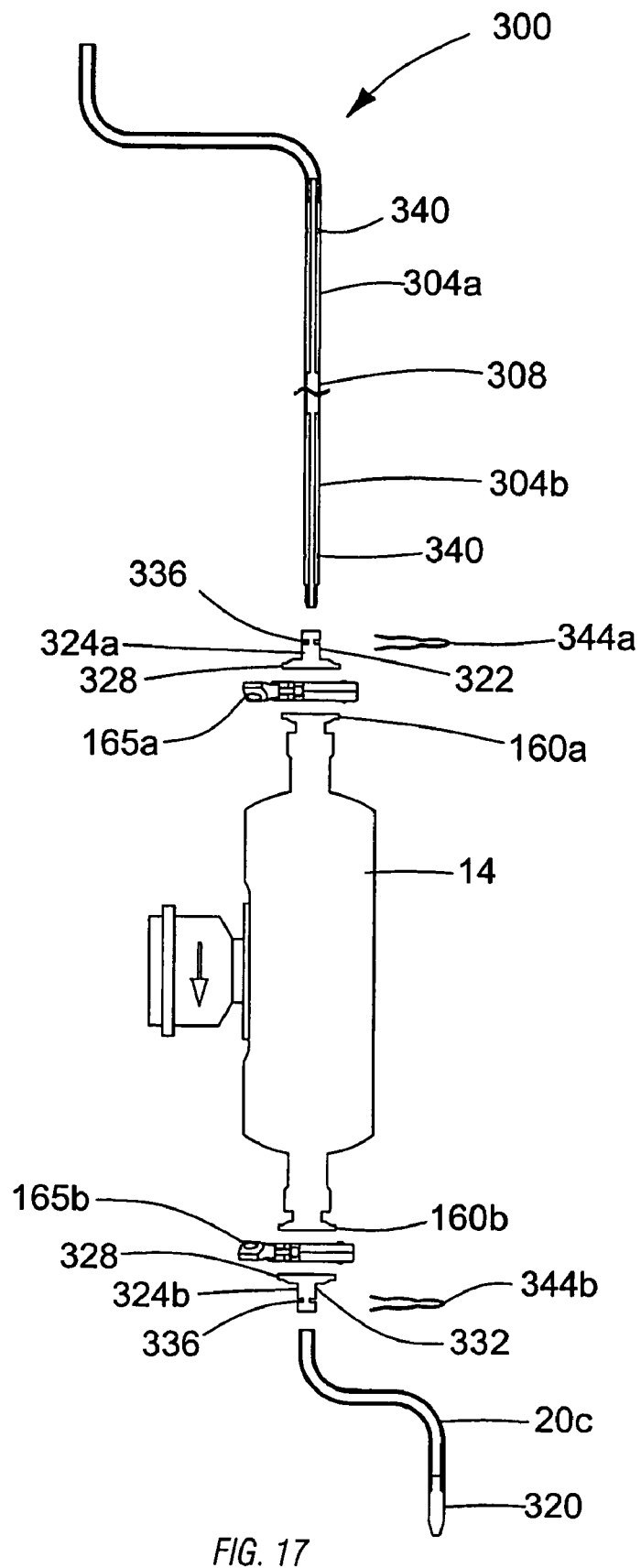
FIG. 17 is an exploded view of the filling system of FIG. 16.
Figure 18:
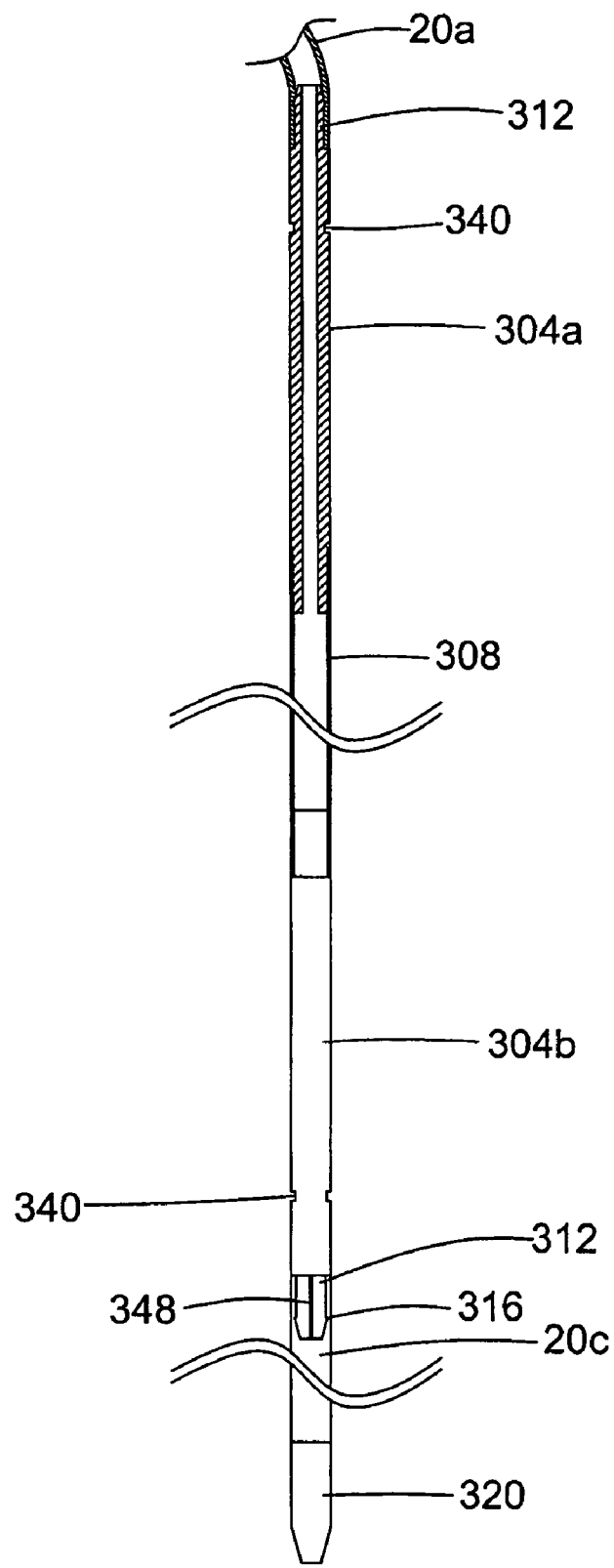
FIG. 18 is a plan view, partially in section, of the disposable fill line shown in FIGS. 16 and 17.

FIGS. 16-24a illustrate yet another filling system using another embodiment of a disposable fill line 300. Like parts of the filling system have been given like reference numerals. Referring to FIG. 18, the portion of the disposable fill line 300 defining the conduit portion 20b, 20 includes first and second tube liner inserts 304a, 304b and a liner 308. The tube liner inserts 304a, 304b are secured to opposite ends of the liner 308 using any suitable thermal, RF, or adhesive bonding techniques or other suitable coupling techniques, such that a fluid flow path is defined through the tube liner inserts 304a, 304b and the liner 308. In the illustrated embodiment, the ends of the tube liner inserts 304 not coupled to the liner 308 include a reduced-diameter connection tip 312 that can be configured with a barb 316 or in other suitable manners to facilitate connection of the tube liner inserts 304 to the other conduit portions 20a, 20c of the disposable fill line 300. Additionally, the conduit portions 20a, 20c can further be bonded or otherwise secured to the respective connection tips 312 using any suitable thermal, RF, or adhesive bonding techniques. As shown in FIGS. 16, 17 and 18, the disposable fill line 300 also includes a plastic nozzle 320 connected to the conduit portion 20c. While not shown, the disposable fill line 300 can also include end caps that cover the nozzle 320 and the free end of the conduit portion 20a, as described above with respect to the disposable fill line 100.

In a similar manner as described above with respect to fill line 100, the conduit portions 20a, 20c, and the liner 308 of the disposable fill line 300 can be made from C-FLEX tubing or other suitable materials. The tube liner inserts 304a, 304b and the nozzle 320 can also be made from C-FLEX tubing or other suitable plastics, but in the illustrated embodiment are more rigid than the conduit portions 20a, 20c and the liner 308.

Like the fill line 100 discussed above, the entire fill line 300 can be pre-assembled and packaged in a single package, and if the fill line 300 is to be used in a sterile application, the entire package can be sterilized via an irradiation process, an ethylene oxide treatment, or other suitable sterilization techniques. The fill line 300 could be used once, disposed of, and then a new, sterilized fill line assembly 300 could be inserted for use in the filling system, thereby eliminating the need for CIP or SIP processes and validation processes.

To accommodate and position the disposable fill line 300 with respect to the flow meter 14, the filling system includes first and second end cap fixtures 324a, 324b (best shown in FIGS. 16 and 17). The end cap fixtures 324a, 324b are substantially identical, and each includes a flange 328 configured to engage with the corresponding flange 160a, 160b on the upper or lower end of the cylinder 22. A gasket or seal ring can be positioned between the flange 328 and the corresponding flange 160a, 160b if desired. Each end cap fixture 324a, 324b further includes a tubular body portion 332 extending from the flange 328. The tubular body portion 332 includes a slot or groove 336, the purpose of which will be described in detail below. The illustrated end cap fixtures 324a, 324b are made of metal (e.g., stainless steel), however, they could alternatively be made of a suitable plastic material.

Figure 19:
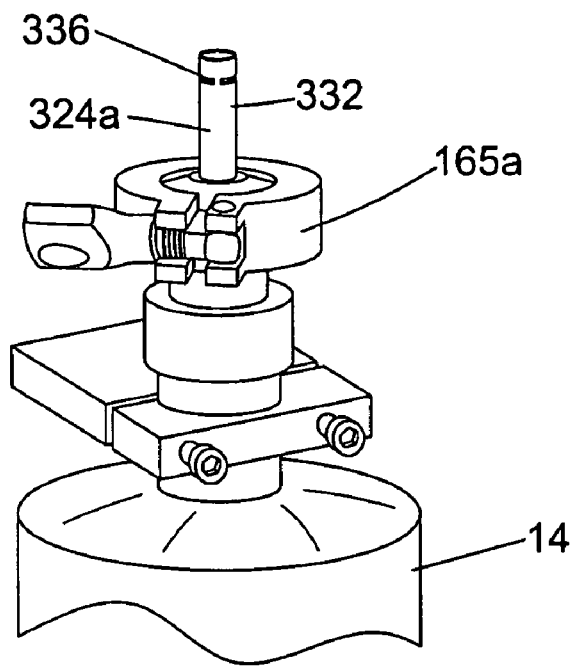
FIG. 19 is a partial perspective view of the upper end cap fixture secured to the flow meter.
Figure 20:
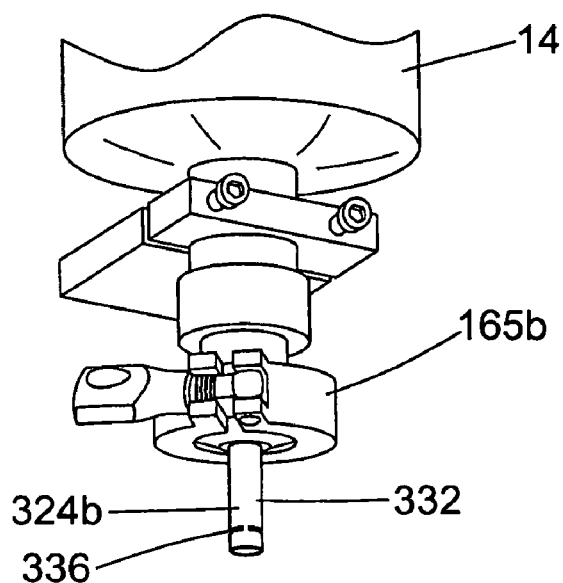
FIG. 20 is a partial perspective view of the lower end cap fixture secured to the flow meter.

FIGS. 19 and 20 illustrate the end cap fixtures 324a, 324b secured to the respective flanges 160a, 160b by clamps 165a, 165b. Next, the pre-assembled disposable fill line 300 can be inserted into the body portion 332 of the upper end cap fixture 324a, beginning with the nozzle 320, and is fed through the flow meter 14 in a manner similar to that discussed above (e.g., using a rod or other suitable insertion aid), until the liner 308 is positioned in the tube 24 between the upper and lower end cap fixtures 324a, 324b. Those skilled in the art will also understand that the fill line 300 could alternatively be inserted from the bottom of the flow meter 14 in an upward direction. Furthermore, if the fill line is not completely pre-assembled, installation of the tube liner inserts 304a, 304b and the liner 308 can take place prior to connecting the conduit portions 20a, 20c.

Figure 21:
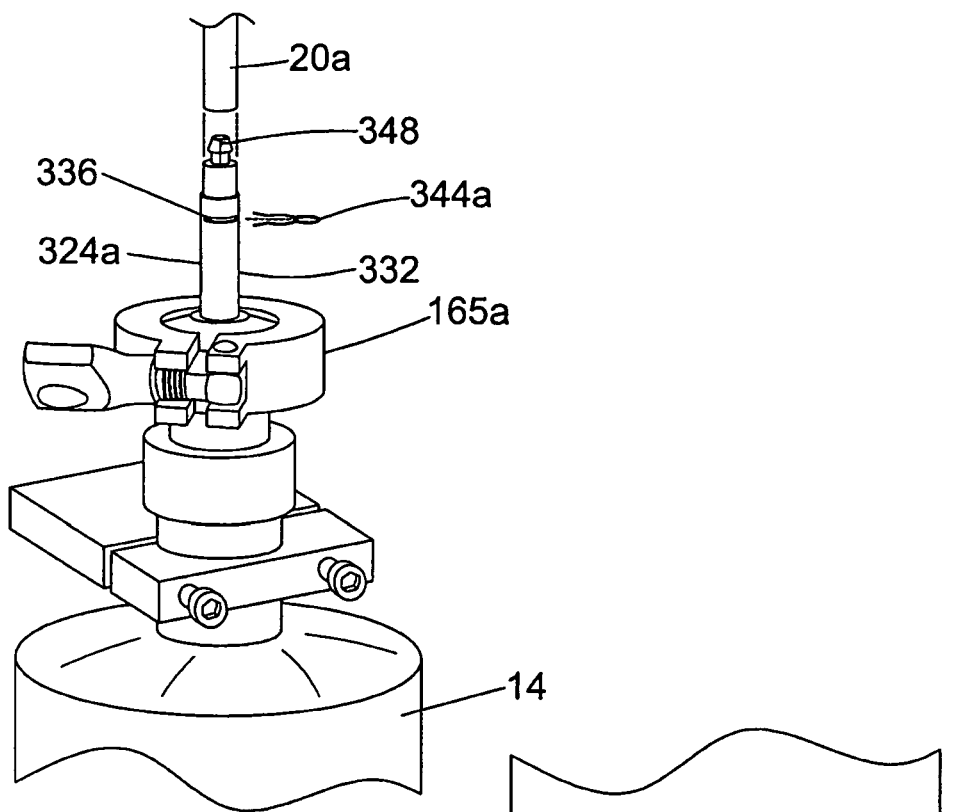
FIG. 21 is a view similar to FIG. 19 illustrating the connection of the disposable fill line to the upper end cap fixture.

With reference to FIG. 21, the upper tube liner insert 304a is positioned with respect to the upper end cap fixture 324a such that a groove or slot 340 (see FIG. 18) formed in the tube liner insert 304a is aligned with the groove 336 in the body portion 332 of the upper end cap fixture 324a. A hairpin clip 344a or other suitable securing device can be positioned in the groove 336 and the slot 340 to retain the tube liner insert 304a in position (e.g., axially and rotationally) relative to the upper end cap fixture 324a.

Figure 22:
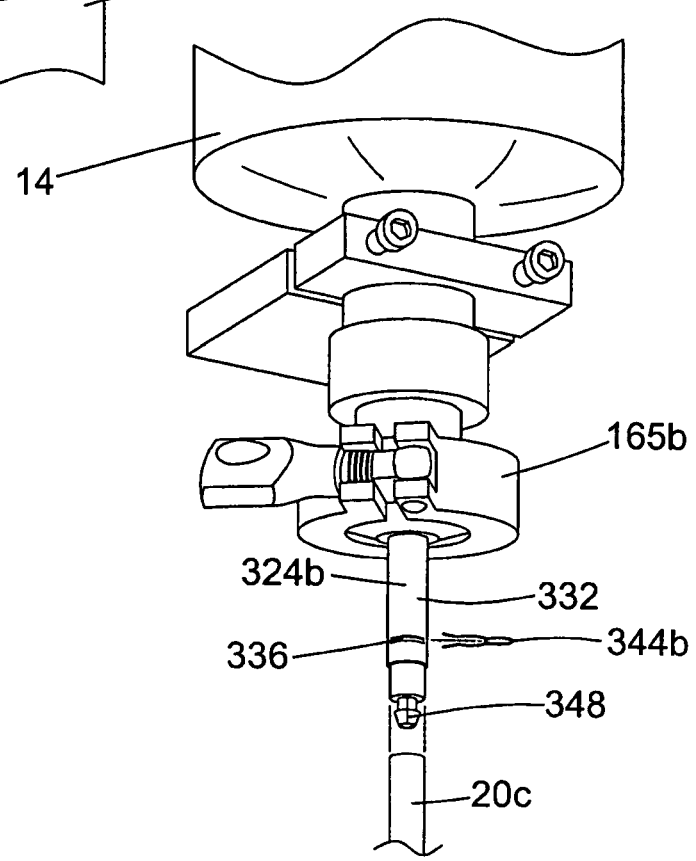
FIG. 22 is a view similar to FIG. 20 illustrating the connection of the disposable fill line to the lower end cap fixture.

Once the upper tube liner insert 304a is secured relative to the flow meter 14, the lower tube liner insert 304b is positioned with respect to the lower end cap fixture 324b both axially and rotationally. In the illustrated embodiment, the lower tube liner insert 304b can be pulled axially, thereby stretching the liner 308 somewhat, until the slot 340 in the lower tube liner insert 304b is aligned with the groove 336 in the lower end cap fixture 324b. With reference to FIG. 22, an alignment mark or indicia 348 (see also FIG. 18) formed on the reduced diameter tip 312 (and visible through the connected translucent conduit 20c) or elsewhere on the lower tube liner insert 304b can be rotationally aligned with a similar alignment mark or indicia 348 on the upper tube liner insert 304a (see FIG. 21) to ensure that the liner 308 is not twisted inside the tube 24. The alignment marks 348 can be printed on the tube liner inserts 304a, 304b, can be machined or otherwise formed thereon as projections, detents, ribs or grooves, or can be otherwise suitably attached or provided. Once the lower tube liner insert 304b is axially and rotationally aligned, a hairpin clip 344b or other suitable securing device is positioned in the groove 336 and the slot 340 to retain the tube liner insert 304b in position (e.g., axially and rotationally) relative to the lower end cap fixture 324b.

Figure 23:
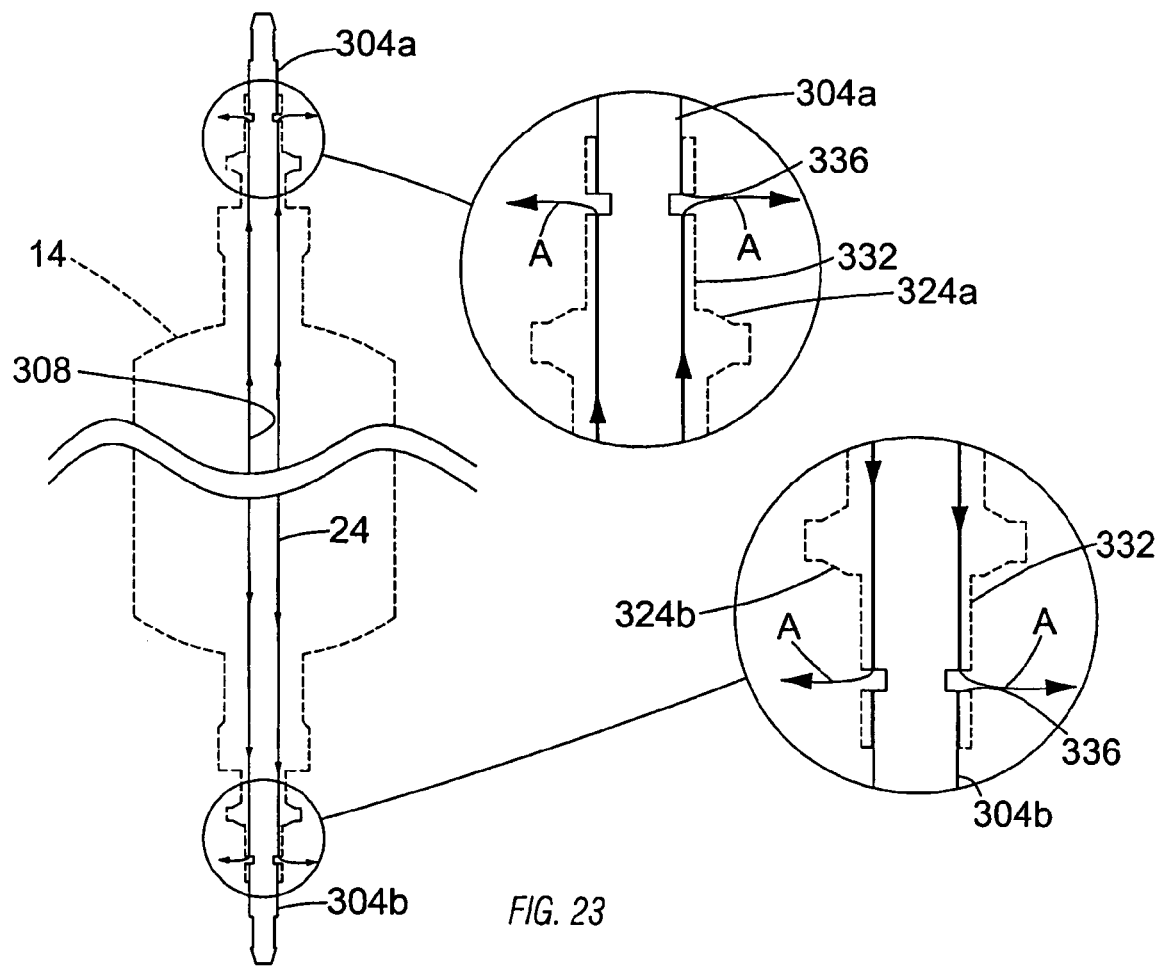
FIG. 23 is schematic view illustrating the air purge pathways for the filling system of FIG. 16.
Figure 24A:
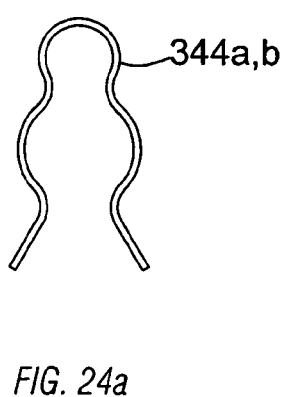
FIG. 24a is a plan view of a hairpin clip used to connect the disposable fill line to the upper and lower end cap fixtures.
Figure 24B:
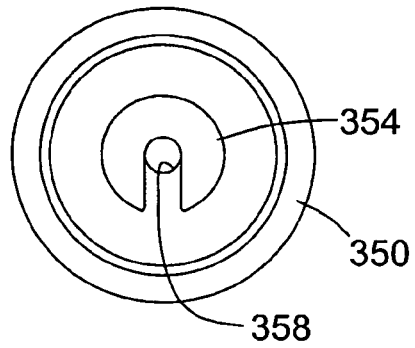
FIG. 24b is a plan view of an alternative end cap fixture and C-clip arrangement operable to secure the disposable fill line in position with respect to the flow meter.

Once the fill line 300 is inserted into the flow meter 14, the fill system can be started and operated in much the same manner as previously discussed above. Note, however, that in the embodiment of FIGS. 16-24a, the purging or evacuation of gas (e.g., air) trapped between the outer surface of the liner 308 and the inner wall of the tube 24 occurs in a slightly different manner. With reference to FIG. 23, air is purged from between the liner 308 and the tube 24 by allowing the air to travel toward a respective end cap fixture 324a, 324b, between an outer surface of the respective tube liner insert 304a, 304b and the inner surface of the respective body portion 332, and out of the groove 336 formed in each end cap fixture 324a, 324b (as represented by the arrows A in FIG. 23). Additionally, or alternatively, the embodiment of FIGS. 16-24a could also be modified to include a vacuum assembly similar to the vacuum assemblies 179, 245 discussed above to further facilitate purging gas from between the liner 308 and the tube 24.

Those skilled in the art will understand that changes to the embodiment of FIGS. 16-24a can be made without departing from the scope of the invention. For example, FIG. 24b illustrates an alternative option for securing the fill line 300 with respect to the flow meter 14. In the embodiment of FIG. 24b, an end cap fixture 350 is illustrated and is generally similar in shape to the flanges 328 of the end cap fixtures 324a, 324b, but does not include a tubular body portion extending therefrom. A substantially C-shaped clip 354 made of plastic or other suitable materials is used to secure the respective tube liner inserts 304a, 304b in position with respect to the flanges 160a, 160b of the flow meter 14 by sliding the C-shaped clip 354 around the slot 340 of the tube liner inserts 304a, 304b. The slot 340 may need to be re-sized in order to fit properly within the C-shaped clip 354. Once the clip 354 is positioned around the slot 340 in the tube liner insert 304a, 304b and rests on the respective flange 160a, 160b, the end cap fixture 350 can be placed over the clip 354 on the respective flange 160a, 160b and clamped with clamps 165a, 165b to secure the assembly. The tube liner inserts 304a, 304b extend through an aperture 358 in the respective end cap fixture 350 for connection to the respective conduit 20a, 20c.

While various embodiments of the invention are illustrated and described, each provides a liner for a flow meter that can be positioned in the tube of the flow meter and removably coupled with the tube such that fluid flowing through the tube flows through the liner without contacting an inner surface of the tube. After use, the liner can be removed from the tube without requiring substantial disassembly of the flow meter and without requiring the removal of the tube from within the flow meter. The liner does not permanently modify or affect the tube, and therefore, the flow meter remains operable both with a liner installed and without a liner installed. The liner provides a cost-effective alternative to the CIP/SIP and validation processes commonly required for pharmaceutical applications utilizing a flow meter. Additionally, the liner can provide a cost-effective manner of protecting the tube of the flow meter in applications involving caustic and/or corrosive materials.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

Various features of the invention are set forth in the following claims.

What is claimed is:

1. A flow meter assembly comprising:
a Coriolis mass flow meter including a tube through which a fluid flows, the tube having an inner surface, the flow meter configured to measure the amount of fluid flowing through the tube by measuring the oscillations of the tube; and a liner positioned within the tube such that an outer surface of the liner substantially contacts the inner surface of the tube, the liner oscillating with the tube and being removably coupled with the flow meter such that fluid flowing through the tube flows through the liner without contacting the inner surface of the tube, wherein the liner is removably disposed within the tube without removing the tube from the flow meter.

2. The flow meter assembly of claim 1, wherein the liner is made of a flexible plastic tubing.

3. The flow meter assembly of claim 2, wherein the liner is made of a thermoplastic elastomer tubing.

4. The flow meter assembly of claim 1, wherein the flow meter is operable to measure fluid flowing through the tube both when the liner is coupled with the tube and when the liner is removed from the tube.

5. The flow meter assembly of claim 1, wherein the liner is in close contact with the inner surface of the tube such that substantially no gases are trapped between the liner and the inner surface of the tube.

6. The flow meter assembly of claim 5, further comprising a purging device configured to remove gases trapped between the liner and the inner surface of the tube.

7. The flow meter assembly of claim 6, wherein the purging device is a vacuum assembly.

8. The flow meter assembly of claim 5, wherein the liner is expanded into engagement with the inner surface of the tube by the fluid passing through the liner.

9. The flow meter assembly of claim 1, wherein the liner is part of a fill line that defines a fluid flow pathway from a fluid supply, through the flow meter, and to a fluid discharge nozzle.

10. The flow meter assembly of claim 9, wherein the fluid discharge nozzle is part of the fill line.

11. The flow meter assembly of claim 9, wherein the entire fill line is made of plastic.

12. The flow meter assembly of claim 9, wherein the fill line is a sterilized fill line.

13. The flow meter assembly of claim 9, wherein the fill line includes a first tube liner insert configured to be engaged with a first end of the liner and a second tube liner insert configured to be engaged with a second end of the liner, each of the tube liner inserts configured to receive a securing device for securing the liner within the tube.

14. The flow meter assembly of claim 13, wherein the tube liner inserts are more rigid than the liner.

15. The flow meter assembly of claim 1, wherein the liner is a sterilized liner.

16. A flow meter assembly comprising:
a Coriolis mass flow meter including a tube through which a fluid flows the tube having an inner surface, the flow meter being configured to measure the amount of fluid flowing through the tube by measuring the oscillations of the tube; and
a liner positioned within the tube such that an outer surface of the liner substantially contacts the inner surface of the tube, the liner oscillating with the tube and being removably coupled with the flow meter such that fluid flowing through the tube flows through the liner without contacting the inner surface of the tube, wherein the liner is removably coupled to the tube without the use of any mechanical bonding between the liner and the inner surface of the tube.

17. A method of operating a Coriolis mass flow meter assembly including a Coriolis mass flow meter having a tube through which a fluid flows, the Coriolis mass flow meter being operable to measure the amount of fluid flowing through the tube, and a liner configured to be positioned within the tube, the method comprising:
inserting the liner into the tube such that an outer surface of the liner substantially contacts an inner surface of the tube;
oscillating the tube and liner while passing a fluid through the tube such that the fluid flows through the liner without contacting the inner surface of the tube;
measuring the oscillations of the tube using the Coriolis mass flow meter; and
after passing the fluid through the tube, removing the liner from the tube, wherein inserting the liner into the tube is done without removing the tube from the flow meter.

18. The method of claim 17, further comprising:
evacuating gas from between the inserted liner and the inner surface of the tube.

19. The method of claim 18, wherein a purging device is used to evacuate the gas from between the inserted liner and the inner surface of the tube.

20. The method of claim 19, wherein the purging device is a vacuum assembly.

21. The method of claim 18, wherein evacuating gas from between the inserted liner and the inner surface of the tube is achieved by passing a fluid through the liner to expand the liner into engagement with the inner surface of the tube.

22. The method of claim 17, wherein removing the liner from the tube is done without removing the tube from the flow meter.

23. The method of claim 17, further comprising:
after removing the liner from the tube, inserting a second liner into the tube; and
passing a fluid through the tube such that the fluid flows through the second liner without contacting the inner surface of the tube.

24. The method of claim 23, wherein no cleaning fluid is passed through the tube after removing the liner from the tube and before inserting the second liner into the tube.

25. The method of claim 23, wherein the fluid flowing through the first liner is different from the fluid flowing through the second liner.

26. The method of claim 17, wherein the liner is sterilized prior to being inserted into the tube.

27. The method of claim 17, wherein inserting the liner into the tube includes securing the liner with respect to the flow meter by coupling the liner to the flow meter at a location spaced from the tube.

28. The method of claim 17, wherein fluid flowing through the liner expands the liner into engagement with an inner surface of the tube.

29. The method of claim 17, wherein inserting the liner into the tube includes rotationally aligning the portions of the liner at opposite ends of the tube to ensure that the liner is not substantially twisted within the tube.

30. The method of claim 17, wherein the liner is part of a fill line that defines a fluid flow pathway from a fluid supply, through the flow meter, and to a fluid discharge nozzle, and wherein fluid flows from the fluid supply, through the flow meter, and to the fluid discharge nozzle through the fill line.

31. The method of claim 30, wherein the fill line includes the fluid discharge nozzle and wherein inserting the liner into the tube includes first passing the fluid discharge nozzle through the tube.

32. The method of claim 30, wherein the liner portion of the fill line includes a liner conduit connected between two tube liner inserts, and wherein inserting the liner into the tube includes positioning the liner conduit and at least a portion of each tube liner insert within the tube.

33. The method of claim 30, wherein the liner portion of the fill line includes a liner conduit connected between two tube liner inserts, and wherein inserting the liner into the tube includes releasably securing the two tube liner inserts with respect to the flow meter at locations spaced from the tube.

34. The method of claim 30, wherein the entire fill line is sterilized prior to being inserted into the tube.

35. A method of operating a Coriolis mass flow meter assembly including a Coriolis mass flow meter having a tube through which a fluid flows, the Coriolis mass flow meter being operable to measure the amount of fluid flowing through the tube, and a liner configured to be positioned within the tube, the method comprising:
  inserting the liner into the tube such that an outer surface of the liner substantially contacts an inner surface of the tube;
  oscillating the tube and liner while passing a fluid through the tube such that the fluid flows through the liner without contacting the inner surface of the tube;
  measuring the oscillations of the tube using the Coriolis mass flow meter; and
  after passing the fluid through the tube, removing the liner from the tube, wherein inserting the liner into the tube is accomplished without mechanically bonding the liner to the tube.

36. A fill line for a fluid handling system operable to dispense fluid from a fluid supply through a Coriolis mass flow meter having a tube having an inner surface, the fill line comprising:
  a first portion in fluid communication with the fluid supply and located upstream of the Coriolis mass flow meter;
  a second portion removably positioned within and extending through an enclosed portion of the Coriolis mass flow meter such that an outer surface of the second portion substantially contacts the inner surface of the tube, the Coriolis mass flow meter configured to measure oscillations of the tube and the second portion; and
  a third portion located downstream of the Coriolis mass flow meter, wherein the second portion is removably positioned within a tube in the Coriolis mass flow meter, and wherein the second portion is removably positioned within the tube without any mechanical bonding between the second portion and the tube.

37. The fill line of claim 36, wherein the first, second, and third portions include plastic tubing.

38. The fill line of claim 37, wherein the plastic tubing is sterilized.

39. The fill line of claim 37, wherein the plastic tubing is not uniform over the length of the fill line.

40. The fill line of claim 37, wherein the plastic tubing includes thermoplastic elastomer tubing.

41. The fill line of claim 36, wherein the fill line further includes a fluid discharge nozzle coupled with the third portion.

42. The fill line of claim 41, wherein the fill line further includes a removable cap placed on the fluid discharge nozzle prior to the second portion being removably positioned within the fluid handling device.

43. The fill line of claim 41, wherein the discharge nozzle is sized to be passed through the enclosed portion of the fluid handling device.

44. The fill line of claim 36, wherein the second portion includes a first tube liner insert, a second tube liner insert, and a liner conduit coupled between the first and second tube liner inserts.

45. The fill line of claim 44, wherein the liner conduit is less rigid than the tube liner inserts.

46. The fill line of claim 36, wherein the second portion lines the inner surface of the tube such that a fluid passing through the fluid handling system flows through the second portion without contacting an inner surface of the tube.

* * * * *